United States Patent
Jang et al.

(10) Patent No.: US 12,535,857 B2
(45) Date of Patent: Jan. 27, 2026

(54) DIGITIZER AND DISPLAY DEVICE INCLUDING THE SAME

(71) Applicant: Samsung Display Co., LTD., Yongin-si (KR)

(72) Inventors: Seokwon Jang, Yongin-si (KR); Yong-Kwan Kim, Yongin-si (KR); Hyunjae Na, Yongin-si (KR); Sungguk An, Yongin-si (KR); Chul Ho Jeong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 118 days.

(21) Appl. No.: 18/412,311

(22) Filed: Jan. 12, 2024

(65) Prior Publication Data

US 2024/0281034 A1   Aug. 22, 2024

(30) Foreign Application Priority Data

Feb. 17, 2023 (KR) .................... 10-2023-0021371

(51) Int. Cl.
*G06F 1/16* (2006.01)
(52) U.S. Cl.
CPC .......... *G06F 1/1643* (2013.01); *G06F 1/1616* (2013.01); *G06F 1/1656* (2013.01)
(58) Field of Classification Search
CPC combination set(s) only.
See application file for complete search history.

(56) References Cited

U.S. PATENT DOCUMENTS

| | | | |
|---|---|---|---|
| 10,353,138 B2 | 7/2019 | Park et al. | |
| 11,281,346 B2 | 3/2022 | Hirotsugu et al. | |
| 11,314,367 B2 | 4/2022 | Jung | |
| 11,592,951 B2 | 2/2023 | Kishimoto et al. | |
| 12,032,408 B2* | 7/2024 | Lee | G06F 1/1652 |
| 12,166,912 B2* | 12/2024 | Shin | H04M 1/0268 |
| 12,175,034 B2* | 12/2024 | Kishimoto | G06F 3/0446 |
| 12,197,689 B2* | 1/2025 | Yoo | H10K 77/111 |
| 12,354,506 B2* | 7/2025 | Kishimoto | G06F 3/0446 |
| 2021/0333944 A1* | 10/2021 | Jung | H10K 59/40 |
| 2022/0229470 A1 | 7/2022 | Kishimoto et al. | |
| 2022/0283671 A1 | 9/2022 | Sim et al. | |
| 2022/0374045 A1* | 11/2022 | Lee | G06F 1/1652 |
| 2022/0407219 A1* | 12/2022 | An | H04M 1/026 |
| 2023/0015303 A1* | 1/2023 | Ryu | H04M 1/0214 |

(Continued)

FOREIGN PATENT DOCUMENTS

| | | |
|---|---|---|
| KR | 1020210016258 A | 2/2021 |
| KR | 1020210133342 A | 11/2021 |

(Continued)

*Primary Examiner* — Lisa Lea-Edmonds
(74) *Attorney, Agent, or Firm* — CANTOR COLBURN LLP

(57) ABSTRACT

A digitizer includes a first non-folding portion, a folding portion having a plurality of holes, and a second non-folding portion, which are arranged along a first direction, where the digitizer includes a core layer including a polymer, a first insulation layer including a fiber reinforced plastic, and disposed above the core layer, a second insulation layer including the fiber reinforced plastic, and disposed below the core layer, and a plurality of sensing coils disposed between the first insulation layer and the second insulation layer.

22 Claims, 18 Drawing Sheets

(56) References Cited

U.S. PATENT DOCUMENTS

| | | | |
|---|---|---|---|
| 2023/0044193 A1* | 2/2023 | Park | G06F 3/0445 |
| 2023/0114397 A1* | 4/2023 | Kishimoto | H05K 5/0217 |
| | | | 361/807 |
| 2023/0215301 A1* | 7/2023 | Kishimoto | G06F 3/046 |
| | | | 361/679.27 |
| 2024/0143097 A1* | 5/2024 | Kishimoto | G06F 3/046 |
| 2024/0160328 A1* | 5/2024 | Gu | H04M 1/0216 |
| 2024/0281034 A1* | 8/2024 | Jang | G06F 1/1616 |
| 2024/0361805 A1* | 10/2024 | Lee | G06F 1/1643 |
| 2025/0063112 A1* | 2/2025 | Shin | H04M 1/0268 |

FOREIGN PATENT DOCUMENTS

| | | |
|---|---|---|
| KR | 102360203 B1 | 2/2022 |
| KR | 1020220049066 A | 4/2022 |
| KR | 1020220105564 A | 7/2022 |
| KR | 1020220126326 A | 9/2022 |

* cited by examiner

DIGITIZER AND DISPLAY DEVICE INCLUDING THE SAME

This application claims priority to Korean Patent Application No. 10-2023-0021371, filed on Feb. 17, 2023, and all the benefits accruing therefrom under 35 U.S.C. § 119, the content of which in its entirety is herein incorporated by reference.

BACKGROUND

1. Field

The present disclosure herein relates to a digitizer and a display device including the same, and more particularly, to a digitizer with improved reliability, and a display device including the same.

2. Description of the Related Art

A display device includes an active region activated in response to an electrical signal. The display device may sense an input applied from the outside through the active region, and simultaneously display various images to provide information to a user.

The display device includes a digitizer for sensing an input applied from the outside. The digitizer may include various sensing coils to be activated by an electrical signal, and a region in which the sensing coils are activated responds to a signal applied from the outside.

SUMMARY

The present disclosure provides a digitizer with improved reliability.

The present disclosure also provides a display device including the digitizer, thereby having improved reliability.

An embodiment of the invention provides a digitizer including a first non-folding portion, a folding portion provided with a plurality of holes defined therethrough, and a second non-folding portion, which are arranged along a first direction, where the digitizer includes a core layer including a polymer, a first insulation layer including a fiber reinforced plastic, and disposed above the core layer, a second insulation layer including the fiber reinforced plastic, and disposed below the core layer, and a plurality of sensing coils disposed between the first insulation layer and the second insulation layer.

In an embodiment, the fiber reinforced plastic may include a glass fiber reinforced plastic or a carbon fiber reinforced plastic, and the first insulation layer and the second insulation layer may include a same material as each other.

In an embodiment, a thickness of the first insulation layer and a thickness of the second insulation layer may be the same as each other, and each of the thickness of the first middle layer and the thickness of the second middle layer may be in a range of about 40 micrometers ($\mu m$) to about 100 $\mu m$.

In an embodiment, the digitizer may further include a first middle layer disposed between the core layer and the first insulation layer, and a second middle layer disposed between the core layer and the second insulation layer, where each of the first middle layer and the second middle layer may include the fiber reinforced plastic.

In an embodiment, a thickness of the first middle layer and a thickness of the second middle layer may be the same as each other, and each of the thickness of the first middle layer and the thickness of the second middle layer may be in a range about 40 $\mu m$ to about 60 $\mu m$.

In an embodiment, the digitizer may further include a first middle layer disposed between the core layer and the first insulation layer, and a second middle layer disposed between the core layer and the second insulation layer, where each of the first middle layer and the second middle layer may each include the polymer.

In an embodiment, a thickness of the first middle layer and a thickness of the second middle layer may be the same as each other, and each of the thickness of the first middle layer and the thickness of the second middle layer may be in a range of about 10 $\mu m$ to about 20 $\mu m$.

In an embodiment, the digitizer may further include a bending portion spaced apart from the folding portion and disposed adjacent to the second non-folding portion, where on a plane, the first insulation layer and the second insulation layer may correspond to the first and second non-folding portions and the folding portion, and on the plane, the core layer, the first middle layer, the second middle layer, and the sensing coils may correspond to the first and second non-folding portions, the folding portion, and the bending portion.

In an embodiment of the invention, a digitizer includes a first non-folding portion, a folding portion provided with a plurality of holes defined therethrough, and a second non-folding portion, which are disposed along a first direction, where the digitizer includes a first insulation layer, a second insulation layer including a same material as the first insulation layer, and disposed below the first insulation layer, a core layer including a polymer, and disposed between the first insulation layer and the second insulation layer, a first middle layer disposed between the core layer and the first insulation layer, a second middle layer including a same material as the first middle layer, and disposed between the core layer and the second insulation layer, and a plurality of sensing coils disposed between the first insulation layer and the second insulation layer.

In an embodiment, a thickness of the first insulation layer and a thickness of the second insulation layer may be the same as each other, and a thickness of the first middle layer and a thickness of the second middle layer may be the same as each other.

In an embodiment, each of the first insulation layer and the second insulation layer may include a glass fiber reinforced plastic or a carbon fiber reinforced plastic.

In an embodiment, each of the first middle layer and the second middle layer may include a glass fiber reinforced plastic or a carbon fiber reinforced plastic.

In an embodiment, each of the first middle layer and the second middle may include the polymer.

In an embodiment, the digitizer may further include a bending portion spaced apart from the folding portion and disposed adjacent to the second non-folding portion, where on a plane, the first insulation layer and the second insulation layer may correspond to the first and second non-folding portions and the folding portion, and on the plane, the core layer, the first middle layer, the second middle layer, and the sensing coils may correspond to the first and second non-folding portions, the folding portion, and the bending portion.

In an embodiment of the invention, a display device includes a digitizer including a first non-folding portion, a folding portion provided with a plurality of holes defined therethrough, and a second non-folding portion, which are arranged along a first direction, a panel protection film disposed on the digitizer, a display panel disposed on the panel protection film, and an adhesive layer including a first portion attached between the panel protection film and the first non-folding portion of the digitizer, and a second portion attached between the panel protection film and the second non-folding portion of the digitizer, where the digitizer includes a core layer including a polymer, a first insulation layer including a fiber reinforced plastic, and disposed between the core layer and the panel protection film, a second insulation layer including the fiber reinforced plastic, and disposed spaced apart from the panel protection film with the core layer interposed therebetween, and a plurality of sensing coils disposed between the first insulation layer and the second insulation layer.

In an embodiment, the fiber reinforced plastic may include a glass fiber reinforced plastic or a carbon fiber reinforced plastic, and the first insulation layer and the second insulation layer may include a same material as each other.

In an embodiment, a thickness of the first insulation layer and a thickness of the second insulation layer may be the same as each other.

In an embodiment, the digitizer may further include a first middle layer disposed between the core layer and the first insulation layer, and a second middle layer disposed between the core layer and the second insulation layer, where each of the first middle layer and the second middle layer may include the fiber reinforced plastic, and a thickness of the first middle layer and a thickness of the second middle layer may be the same as each other.

In an embodiment, the digitizer may further include a first middle layer disposed between the core layer and the first insulation layer, and a second middle layer disposed between the core layer and the second insulation layer, where each of the first middle layer and the second middle layer may include the polymer, and a thickness of the first middle layer and a thickness of the second middle layer may be the same as each other.

In an embodiment, the digitizer may further include a bending portion spaced apart from the folding portion and disposed adjacent to the second non-folding portion, where on a plane, the first insulation layer, and the second insulation layer may correspond to the first and second non-folding portions and the folding portion, and on the plane, the core layer, the first middle layer, the second middle layer, and the sensing coils may correspond the first and second non-folding portions, the folding portion, and the bending portion.

In an embodiment, the bending portion may be foldable along an imaginary folding axis extending along a second direction intersecting the first direction, where on the plane, at least a portion of the bending portion may overlap at least a portion of the second non-folding portion.

In an embodiment, a thickness of the digitizer may be in a range of about 100 µm to about 300 µm.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1A:
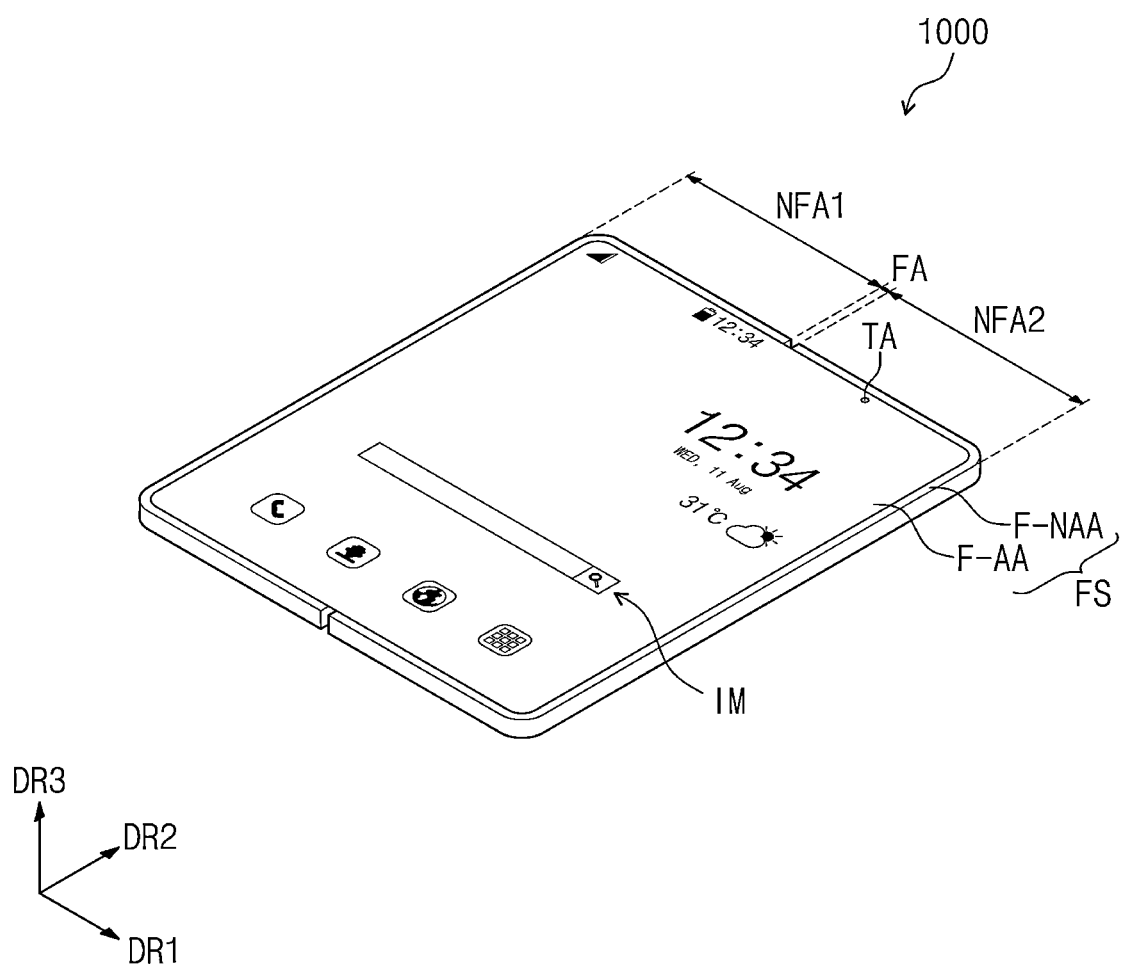
FIG. 1A is a perspective view showing an unfolded state of a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the present disclosure, when an element (or a region, a layer, a portion, etc.) is referred to as being "on," "connected to," or "coupled to" another element, it means that the element may be directly disposed on/connected to/coupled to the other element, or that a third element may be disposed therebetween.

In the present disclosure, being "directly disposed" may mean that there is no layer, film, region, plate, or the like added between a portion of a layer, a film, a region, a plate, or the like and other portions. For example, being "directly disposed" may mean being disposed without additional members such as an adhesive member between two layers or two members.

Like reference numerals refer to like elements. Also, in the drawings, the thickness, the ratio, and the dimensions of elements are exaggerated for an effective description of technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

It will be understood that, although the terms "first," "second," etc. may be used herein to describe various elements, these elements should not be limited by these terms. These terms are only used to distinguish one element from other elements. For example, a first element may be referred to as a second element, and a second element may be referred to as a first element in a similar manner without departing the scope of rights of the invention.

In addition, terms such as "below," "lower," "above," "upper," and the like are used to describe the relationship of the elements shown in the drawings. The terms are used as a relative concept and are described with reference to the direction indicated in the drawings. In the present disclosure, being "disposed on" may not only include the case of being disposed on an upper portion of any one member but also the case of being disposed on a lower portion thereof.

It should be understood that the term "comprise," or "includes" is intended to specify the presence of stated features, integers, steps, operations, elements, components, or combinations thereof in the disclosure, but do not preclude the presence or addition of one or more other features, integers, steps, operations, elements, components, or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which the invention pertains. It is also to be understood that terms such as terms defined in commonly used dictionaries should be interpreted as having meanings consistent with the meanings in the context of the related art, and should not be interpreted in too ideal a sense or an overly formal sense unless explicitly defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a digitizer and a display device according to an embodiment of the invention will be described with reference to the accompanying drawings.

Figure 1B:
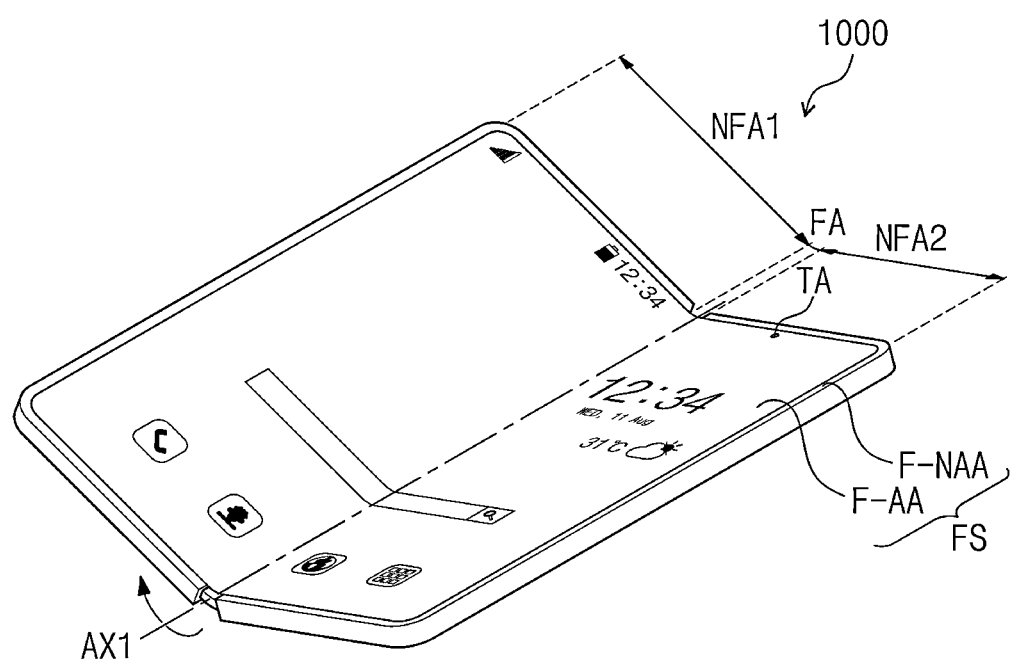
FIG. 1B is a perspective view showing a folding operation state of a display device according to an embodiment of the invention.
Figure 1B:
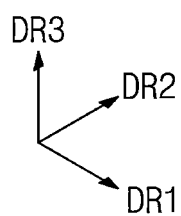
Figure 1C:
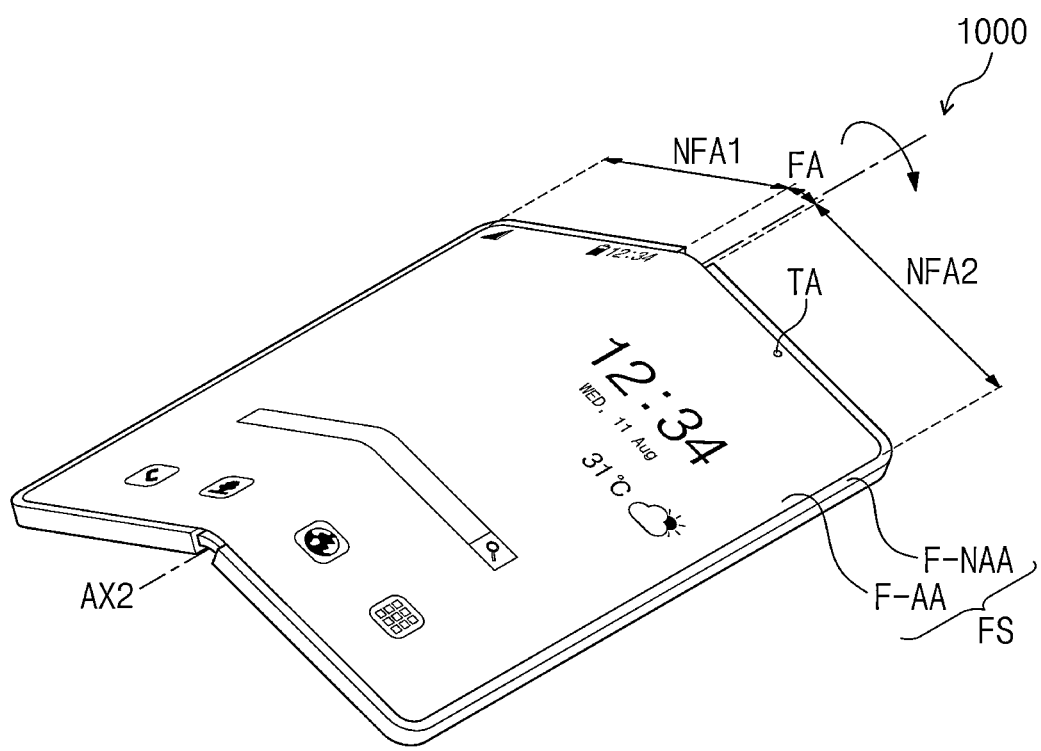
FIG. 1C is a perspective view showing a folding operation state of a display device according to an embodiment of the invention.
Figure 1D:
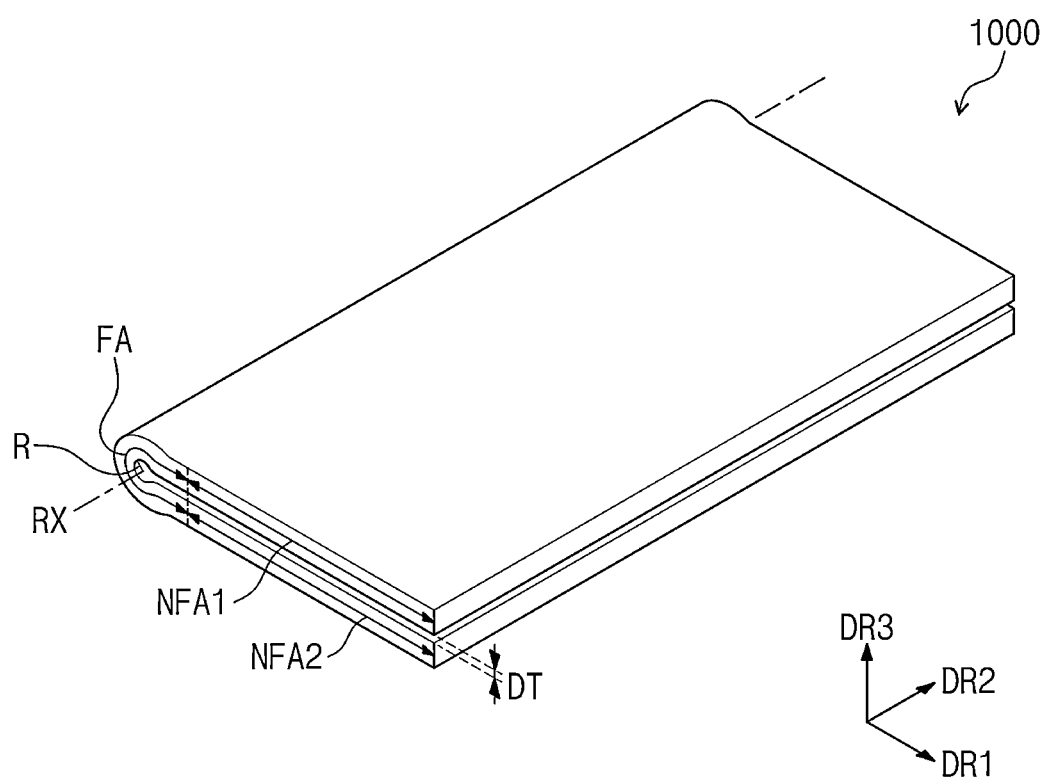
FIG. 1D is a perspective view showing a folded state of a display device according to an embodiment of the invention.
Figure 1E:
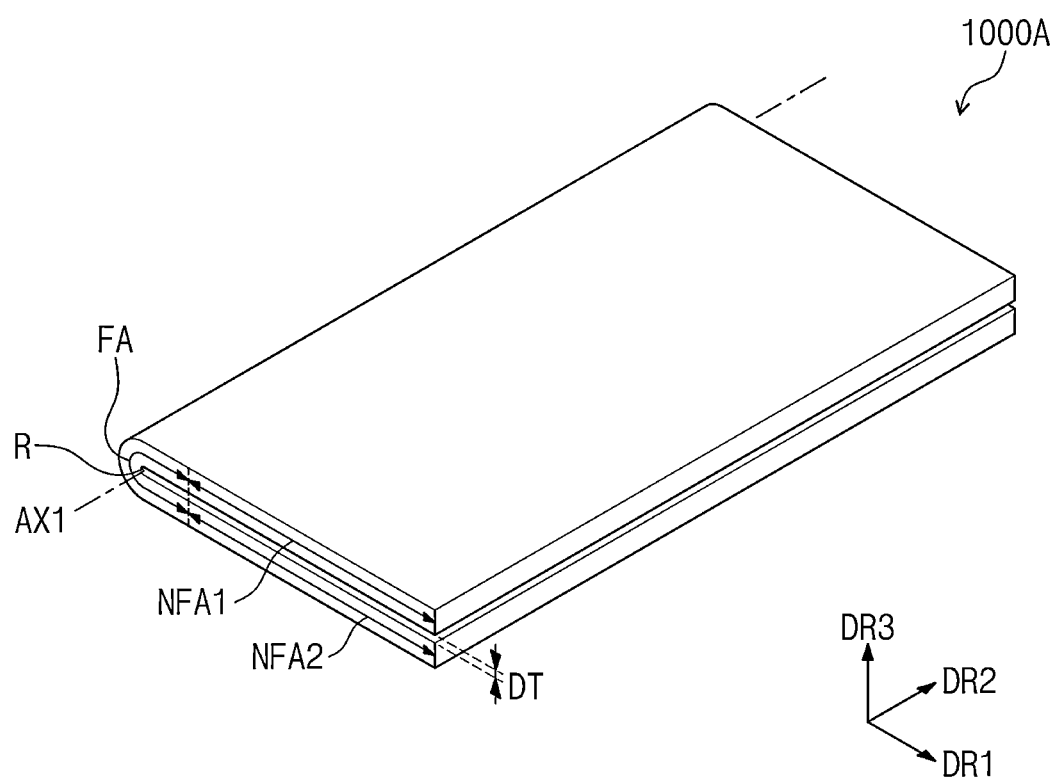
FIG. 1E is a perspective view showing a folded state of a display device according to an embodiment of the invention.

FIG. 1A is a perspective view showing an unfolded state of a display device 1000 according to an embodiment of the invention. FIG. 1B is a perspective view showing a folding operation state of the display device 1000 according to an embodiment of the invention. FIG. 1C is a perspective view showing a folding operation state of the display device 1000 according to an embodiment of the invention. FIG. 1D is a perspective view showing a folded state of the display device 1000 according to an embodiment of the invention. FIG. 1E is a perspective view showing a folded state of the display device 1000 according to an embodiment of the invention.

Referring to FIG. 1A to FIG. 1D, the display device 1000 according to an embodiment of the invention may be a device activated in response to an electrical signal. In an embodiment, for example, the display device 1000 may be a mobile phone (a smart phone), a tablet, a monitor, a laptop, a television, an external billboard, a car navigation system, a game console, a camera, or a wearable device, but the embodiment of the invention is not limited thereto. In FIG. 1A to FIG. 1D, an embodiment where the display device 1000 is a mobile phone is illustrated as an example.

In FIG. 1A to 8B, a first direction DR1, a second direction DR2, and a third direction DR3 are illustrated, and directions indicated by the first direction DR1, the second direction DR2, and the third direction DR3 described in the present disclosure are a relative concept, and may be converted to different directions. In the present disclosure, the first direction DR1 and the second direction DR2 are perpendicular to each other, and the third direction DR3 may be a normal direction with respect to a plane defined by the first direction DR1 and the second direction DR2.

In the present disclosure, a thickness direction of the display device 1000 may be a direction parallel to the third direction DR3, which is the normal direction with respect to the plane defined by the first direction DR1 and the second direction DR2. A front surface (or an upper surface) and a rear surface (or a lower surface) of members constituting the display device 1000 may be defined based on the third direction DR3.

In the present disclosure, "on a plane" may mean being viewed in a direction normal to a plane defined by the first direction DR1 and the second direction DR2. In the present disclosure, unless otherwise defined, "overlapping" may mean overlapping on a plane.

The display device 1000 may display an image IM toward the third direction DR3 on a display surface FS parallel to the first direction DR1 and the second direction DR2. The display surface FS on which the image IM is displayed may correspond to the front surface of display device 1000. The image IM may include both a moving image and a still image. In an embodiment, as shown in FIG. 1A to FIG. 1C, the image IM may be an internet search window, a clock window, or the like, for example.

The display device 1000 may sense an external input applied from the outside. The external input may be a user input. The user input may include various forms of inputs, such as a part of a user's body, light, heat, pressure, or the like. In an embodiment where the display device 1000 senses an input by an electronic pen, the display device 1000 may further include a digitizer driven by a method using electro magnetic resonance (EMR), and is not limited to any one embodiment.

FIG. 1A illustrates an embodiment of the display device 1000 in an unfolded state. The display surface FS of the display device 1000 may include an active region F-AA and a peripheral region F-NAA. The peripheral region F-NAA is adjacent to the active region F-AA. The peripheral region F-NAA has lower light transmittance than the active region F-AA, and may have a predetermined color.

According to an embodiment, as shown in FIG. 1A, the peripheral region F-NAA may surround the active region F-AA. Accordingly, the shape of the active region F-AA may substantially be defined by the peripheral region F-NAA. However, this is only exemplarily illustrated, and the peripheral region F-NAA may be disposed adjacent to only one side of the active region F-AA, or may be omitted.

The display surface FS may further include a signal transmission region TA. In an embodiment, as shown in FIG. 1A, the signal transmission region TA may be included inside the active region F-AA, but the embodiment of the invention is not limited thereto, and alternatively, the signal transmission region TA may be included inside the peripheral region F-NAA, or may be surrounded by each other the active region F-AA and the peripheral region F-NAA. The signal transmission region TA has higher transmittance than the active region F-AA and the peripheral region F-NAA. Natural light, visible light, or infrared light may pass through the signal transmission region TA.

The display device 1000 may further include a sensor which captures an external image through the visible light passing through the signal transmission region TA, or determines proximity of an external object through the infrared light. The sensor may overlap the signal transmission region TA. Accordingly, the display device 1000 including a sensor with improved reliability may be provided.

Referring to FIG. 1B, the display device 1000 according to an embodiment may be a foldable display device 1000. In an embodiment, for example, the display device 1000 may be folded along an imaginary first folding axis AX1 extended in the second direction DR2. The first folding axis AX1 may be on the display surface FS.

The display device of an embodiment may include a folding portion FA which folded by the first folding axis AX1 and a first non-folding portion NFA1 and a second non-folding portion NF A2 spaced apart from each other in the first direction DR1 with the folding portion FA interposed therebetween. That is, the first non-folding portion NFA1, the folding portion FA, and the second non-folding portion NFA2 may be arranged along the first direction DR1.

The display device 1000 may be folded with respect to the first folding axis AX1 to be folded in an in-folding manner in which the first non-folding portion NFA1 and the second non-folding portion NFA2 are folded in a direction in which the first non-folding portion NFA1 and the second non-folding portion NFA2 face each other. In the present disclosure, a 'first mode' may be defined as a state in which the display device 1000 is unfolded, and a 'second mode' may be defined as a state in which the display device 1000 is folded.

Referring to FIG. 1C, the display device 1000 may be folded with respect to a second folding axis AX2 to be folded in an out-folding manner in which the first non-folding portion NFA1 and the second non-folding portion NFA2 are folded in a direction in which the first non-folding portion NFA1 and the second non-folding portion NFA2 oppose each other. The second folding axis AX2 may be on a surface opposing the display surface FS.

The display device 1000 according to an embodiment may be operated in one manner selected from the in-folding manner and the out-folding manner with respect to folding axes extending on a same line. Alternatively, the display device 1000 may be operated in the in-folding manner or the out-folding manner with respect to one folding axis.

Referring to FIG. 1D, when the display device 1000 is subjected to the in-folding, at least a portion of the folding portion FA may have a predetermined curvature. The folding portion FA has a center of curvature RX on an inner side of the folding portion FA, and the display device 1000 may be folded with a predetermined radius of curvature R with respect to the center of curvature RX. According to an embodiment, the radius of curvature R in a folded state may be greater than a distance DT between the first non-folding portion NFA1 and the second non-folding portion NF2.

Referring to FIG. 1E, a display device 1000A according to an embodiment may be folded with the predetermined radius of curvature R, when subjected to the in-folding. In such an embodiment, the distance DT between a surface extending from the folding portion FA to the first non-folding portion NFA1 and a surface extending from the folding portion FA to the second non-folding portion NFA2 in a folded state may be constant along the first direction DR1.

Figure 2:
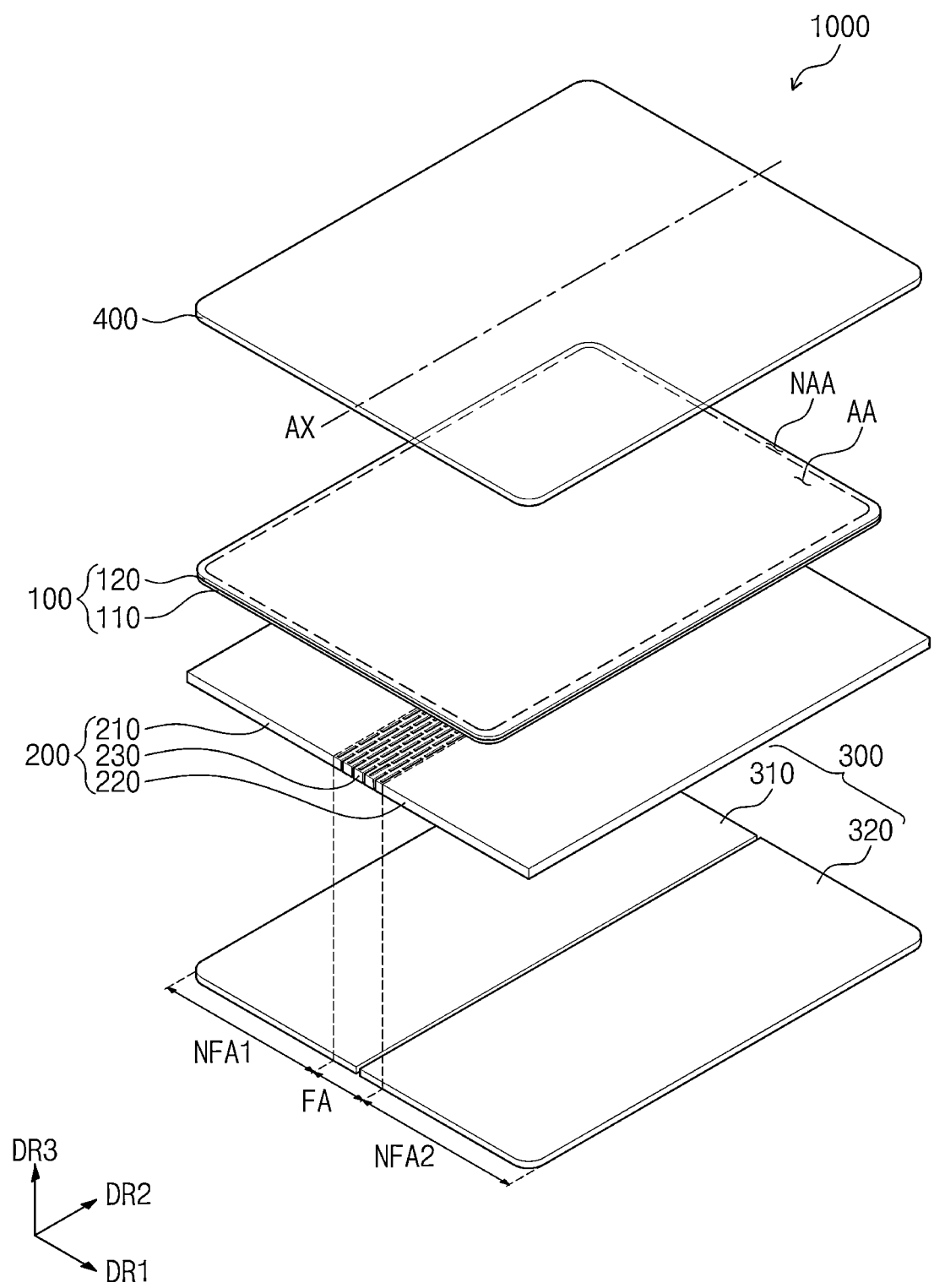
FIG. 2 is an exploded perspective view of a display device according to an embodiment of the invention.
Figure 3:
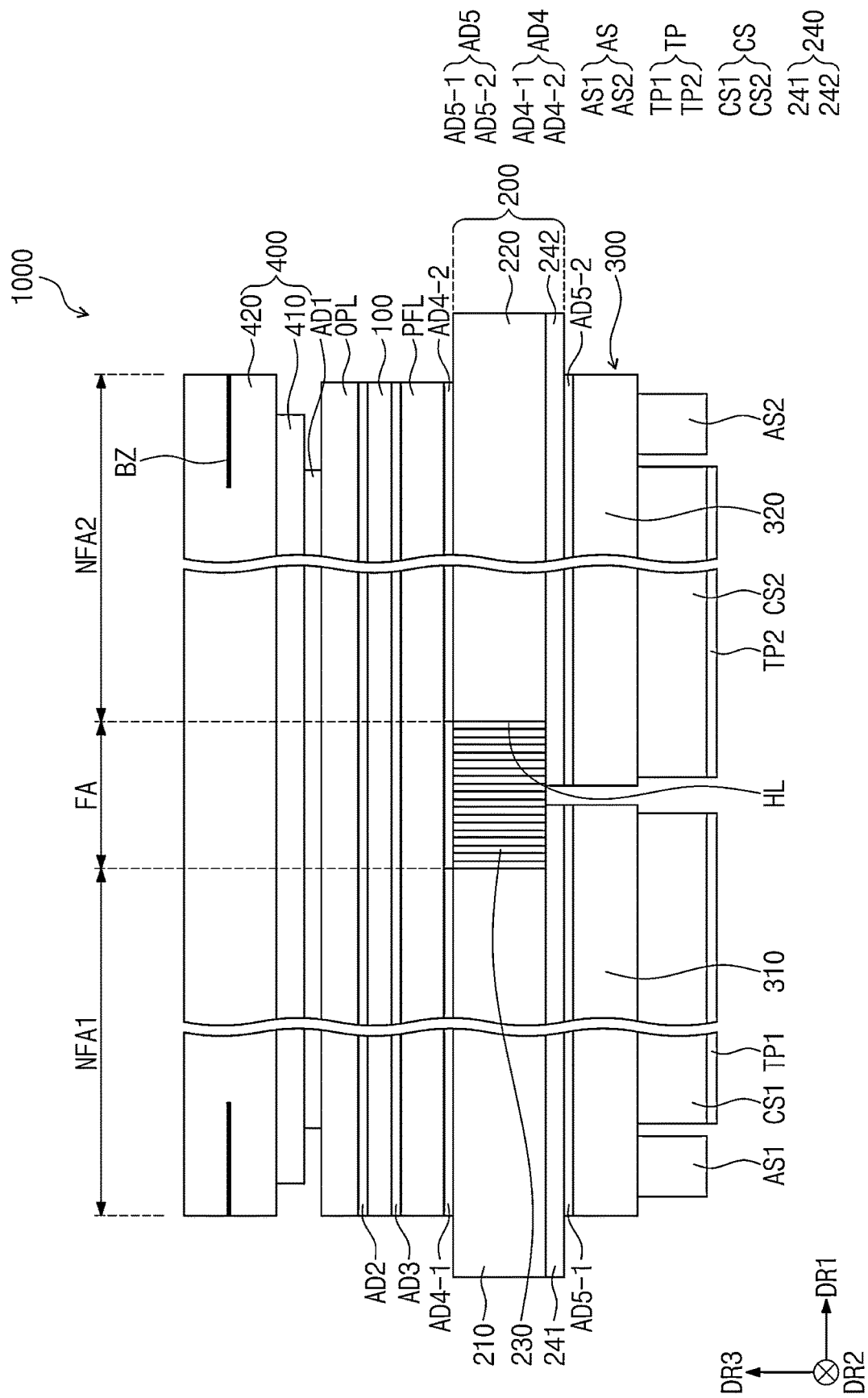
FIG. 3 is a cross-sectional view of a display device according to an embodiment of the invention.

FIG. 2 is an exploded perspective view of the display device 1000 according to an embodiment of the invention. FIG. 3 is a cross-sectional view of the display device 1000 according to an embodiment of the invention.

Referring to FIG. 2 and FIG. 3, an embodiment of the display device 1000 may include a display module 100, a digitizer 200, a cushion layer 300, and a window 400. In such an embodiment, the display device 1000 may include adhesive layers AD1, AD2, AD3, AD4, and AD5, at least one upper functional layer disposed between the display module 100 and the window 400, and at least one lower functional layer disposed in a lower portion of the digitizer 200.

The adhesive layers AD1, AD2, AD3, AD4, and AD5 may include at least one selected from optical clear adhesives (OCA), optical clear resins (OCR), and pressure sensitive adhesives (PSA).

The display module 100 may be flexible. The active region AA of the display module 100 may correspond to an active region F-AA of the display device 1000 illustrated in FIG. 1A, and a peripheral region NAA of the display module 100 may correspond to the peripheral region F-NAA of the display device 1000.

The display module 100 may include a display panel 110 which displays an image and an input sensor 120 which senses an external input.

The display panel 110 may include a plurality of pixels. Each of the pixels may include a display element. In an embodiment, for example, the display element may be an organic light emitting element, an inorganic light emitting element, an organic-inorganic light emitting element a micro light emitting diode (LED), a nano LED, a quantum dot light emitting element, an electrophoretic element, an electrowetting element, or the like. Light emitting layers included in each light emitting element are disposed in the active region AA and emit predetermined colors. In an embodiment where a plurality of light emitting layers are provided, light emitting elements may respectively correspond to the light emitting layers. In an alternative embodiment where a light emitting layer is provided as a single layer, color filters or color conversion members disposed on the light emitting layer may be further included.

The input sensor 120 may be disposed on the display panel 110. The input sensor 120 may be driven in a capacitive manner. The input sensor 120 may sense the position and/or intensity at which a user's hand is applied across the entire surface of the active region AA. The input sensor 120 may include sensing electrodes insulated from each other, routing wires connected to corresponding sensing electrodes, and at least one sensing insulation layer.

The input sensor 120 may be directly formed on the display panel 110 through a continuous process. In this case, the input sensor 120 may be described as being 'directly disposed' on the display panel 110. Being directly formed or disposed may mean that a third element is not disposed between the input sensor 120 and the display panel 110. That is, a separate adhesive member may not be disposed between the input sensor 120 and the display panel 110. However, the embodiment of the invention is not limited thereto, and the input sensor 120 may be provided as a separate module and be coupled to the display panel DP through an adhesive layer.

The digitizer 200 may be disposed in a lower portion of the display module 100. The digitizer 200 may sense an input by an electromagnetic pen. In an embodiment, the digitizer 200 may be driven in a manner using electro magnetic resonance (EMR).

The digitizer 200 may be disposed in the lower portion of the display module 100 to support the display module 100. The digitizer 200 may include a first non-folding portion 210, a second non-folding portion 220, and a folding portion 230. In addition, the digitizer 200 may further include a blocking layer 240. Alternatively, the blocking layer 240 may be omitted.

The first non-folding portion 210 may overlap at least a portion of the first non-folding portion NFA1. The second non-folding portion 220 may overlap at least a portion of the second non-folding portion NFA2. The folding portion 230 may overlap the folding portion FA. The folding portion 230 may be disposed between the first non-folding portion 210 and the second non-folding portion 220.

In the folding portion 230, holes HL extending in the third direction DR3 may be defined or formed. The holes HL may be defined in a region corresponding to the folding portion FA, and may be disposed spaced apart from each other along the first direction DR1 and the second direction DR2.

The blocking layer 240 may include a first blocking layer 241 and a second blocking layer 242. The first blocking layer 241 may overlap a portion of the folding portion 230 and the first non-folding portion 210, and the second blocking layer 242 may overlap another portion of the folding portion 230 and the second non-folding portion 220. The first blocking layer 241 and the second blocking layer 242 may be spaced apart from each other in the folding portion FA along the first direction DR1. However, the embodiment of the invention is not limited thereto, and alternatively, the blocking layer 240 may be disposed in the entire region of the folding portion FA to cover the holes HL.

The blocking layer 240 may include a metal. In an embodiment, for example, the blocking layer 240 may include magnetic metal powder (MMP). However, the material of the blocking layer 240 is not limited thereto, and alternatively, the blocking layer 240 may include at least one selected from permalloy, which is an alloy of nickel (Ni) and iron (Fe), invar (FeNi36), and stainless steel.

In an embodiment, when the display device 1000 is subjected to a folding operation in which the first mode and the second mode are repeated, the shape of the display module 100 may be substantially deformed in correspondence to the shape of the digitizer 200.

Figure 6A:
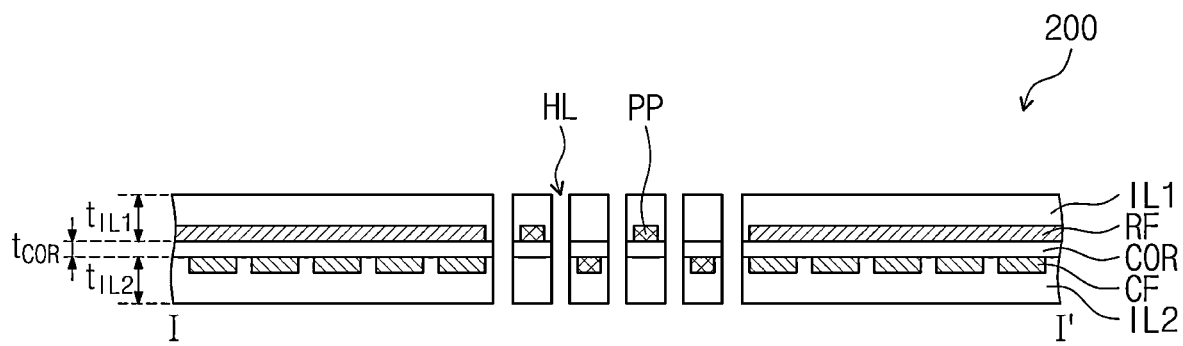
FIG. 6A is a cross-sectional view of a digitizer according to an embodiment of the invention.

The digitizer 200 according to an embodiment of the invention includes first and second insulation layers IL1 and IL2 (see FIG. 6A) including a fiber reinforced plastic, and a plurality of sensing coils RF and CF (see FIG. 6A). Accordingly, the digitizer 200 according to an embodiment of the invention may simultaneously function as a protection member and function as a sensing member that senses an input of an electromagnetic pen. The digitizer 200 will be described in detail later.

The cushion layer 300 may be disposed on the lower portion of the digitizer 200. The cushion layer 300 may protect the display module 100 from an impact transferred from the lower portion of the display module 100. The cushion layer 300 may include foam or sponge. The foam may include polyurethane form or thermoplastic polyurethane foam. In an embodiment where the cushion layer 300 includes the foam, a barrier film may be added as a base layer of the cushion layer 300, and a foaming agent may be foamed on the barrier film to form the cushion layer 300.

The cushion layer 300 may include a first cushion layer 310 and a second cushion layer 320. The first cushion layer 310 may overlap a portion of the folding portion 230 and the first non-folding portion 210. The second cushion layer 320 may overlap another portion of the folding portion 230 and the second non-folding portion 220. The first cushion layer 310 and the second cushion layer 320 may be spaced apart from each other in the folding portion FA along the first direction DR1. A fifth adhesive layer AD5 may include a first portion AD5-1 and a second portion AD5-2. The first portion AD5-1 may couple a portion of the digitizer 200 to the first cushion layer 310, and the second portion AD5-2 may couple another portion of the digitizer 200 to the second cushion layer 320.

The first cushion layer 310 and the second cushion layer 320 may effectively prevent foreign substances from entering the holes HL defined in the folding portion 230 when the display device 1000 is in the first mode. When the display device 1000 is in the second mode, even when the folding portion 230 is folded with a predetermined curvature, the first cushion layer 310 and the second cushion layer 320 are spaced apart from each other in a region overlapping the folding portion 230, so that the shape of the digitizer 200 may be easily deformed.

The window 400 is disposed on display module 100. The window 400 transmits an image from the display module 100, and at the same time, mitigates an external impact, thereby effectively preventing the display module 100 from being damaged or malfunctioning due to the external impact. The window 400 may include an optically transparent material such that light provided from the display module 100 may be transmitted. The window 400 provides the display surface FS (see FIG. 1A) of the display device 1000.

The window 400 may include a first layer 410, a second layer 420, and a bezel pattern BZ. The first layer 410 may include glass. The second layer 420 is disposed on the first layer 410. The second layer 420 may include a material having a modulus relatively low compared to (i.e., lower than) that of the first layer 410. In an embodiment, for example, the second layer 420 may be a film including an organic material. The second layer 420 may be thicker than the first layer 410. Accordingly, the second layer 420 may protect an upper surface of the first layer 410. The second layer 420 may include at least one functional layer. The functional layer may include at least one of a window protection layer, an anti-fingerprint layer, or anti-reflection layer.

The bezel pattern BZ may have a relatively low light transmittance compared to a region of the window 400 in which the bezel pattern BZ is not disposed. In an embodiment, for example, the bezel pattern BZ may have a predetermined color. Accordingly, the bezel pattern BZ may selectively transmit or reflect only light of a specific color. The bezel pattern BZ may be a light blocking layer that absorbs incident light.

The window 400 may include a thin film glass or a synthetic resin film. In an embodiment where the window 400 includes the thin film glass, the thickness of the window 400 may be about 100 micrometers ($\mu$m) or less. In such an embodiment, for example, the thickness of the window 400 may be about 30 $\mu$m, but is not limited thereto. In an embodiment, the window 400 may include a synthetic resin film. In such an embodiment, for example, the window 400 may include a polyimide (PI) film or a polyethylene terephthalate (PET) film.

The window 400 may have a multi-layered structure or single-layered structure. In an embodiment, for example, the window 400 may include a plurality of synthetic resin films coupled with an adhesive, or may include a glass substrate and a synthetic resin film coupled with an adhesive.

The window 400 may include or be made of a soft material. Accordingly, the window 400 may be folded or unfolded with respect to the folding axis AX. That is, according to the operation of the first mode and the second mode, the shape of the window 400 may also be deformed in correspondence to the digitizer 200.

In an embodiment of the display device 1000, an optical layer OPL may be disposed between the display module 100 and the window 400. The optical layer OPL may be coupled to the window 400 through a first adhesive layer AD1, and the optical layer OPL may be coupled to the display module 100 through a second adhesive layer AD2.

The optical layer OPL may reduce the reflectance of external light. The optical layer OPL may include a stretchable synthetic resin film. In an embodiment, for example, the optical layer OPL may be provided by dyeing a polyvinyl alcohol (PVA) film with an iodine compound. Alternatively, the optical layer OPL may include a color filter. The optical layer OPL may include a plurality of various layers as long as the reflectance of external light is reduced, and is not limited to any one embodiment.

In an embodiment of the display device 1000, a panel protection layer PFL may be disposed between the display module 100 and the digitizer 200. The panel protection layer PFL and the display module 100 may be coupled by a third adhesive layer AD3. The panel protection layer PFL is disposed on a lower side of the display module 100 to protect the lower portion of the display module 100. The panel protection layer PFL may include a flexible plastic material. In an embodiment, for example, the panel protection layer PFL may include polyethylene terephthalate.

The digitizer 200 and the panel protection layer PFL may be coupled by a fourth adhesive layer AD4. The fourth adhesive layer AD4 may include a first portion AD4-1 and a second portion AD4-2. The first portion AD4-1 and the second portion AD4-2 may be spaced apart from each other with the folding portion FA disposed therebetween. The first portion AD4-1 may couple the first non-folding portion 210 to a portion of the panel protection layer PFL, and the second portion AD4-2 may couple the second non-folding portion 220 to another portion of the panel protection layer PFL.

In an embodiment, the display device 1000 may further include a metal plate CS, an insulation layer TP, and a step compensation member AS, all of which are disposed on a lower side of the cushion layer 300.

The metal plate CS may absorb an external impact to protect the display module 100. The metal plate CS may include a first metal layer CS1 and a second metal layer CS2. The metal plate CS may include stainless steel.

The insulation layer TP is disposed on a lower portion of the metal plate CS. The insulation layer TP may prevent static electricity from entering the metal plate CS. The insulation layer TP may be an insulation film. The insulation layer TP may be provided as a first insulation layer TP1 and a second insulation layer TP2, and be coupled to the first metal layer CS1 and the second metal layer CS2, respectively. The step compensation member AS is coupled to the lower side of the cushion layer 300. The step compensation member AS may be a double-sided tape or an insulation film. The step compensation member AS may be provided as a first step compensation member AS1 and a second step compensation member AS2, and be coupled to the first cushion layer 310 and the second cushion layer 320, respectively.

In an alternative embodiment of the display device 1000 at least one selected from the metal plate CS, the insulation layer TP, and the step compensation member AS may be omitted, but not being limited to any one embodiment.

Figure 4A:
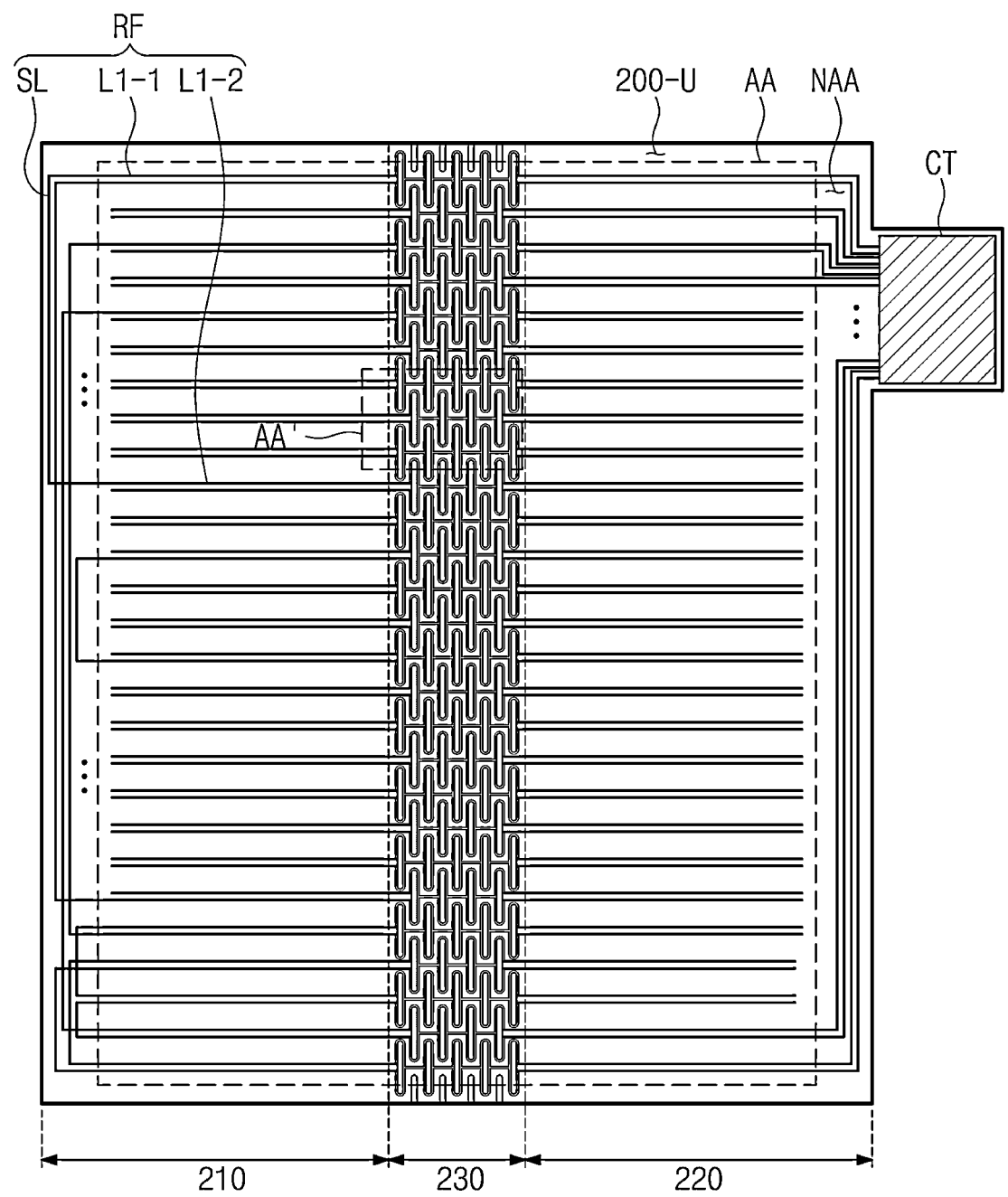
FIG. 4A is a plan view of a digitizer according to an embodiment of the invention.
Figure 4B:
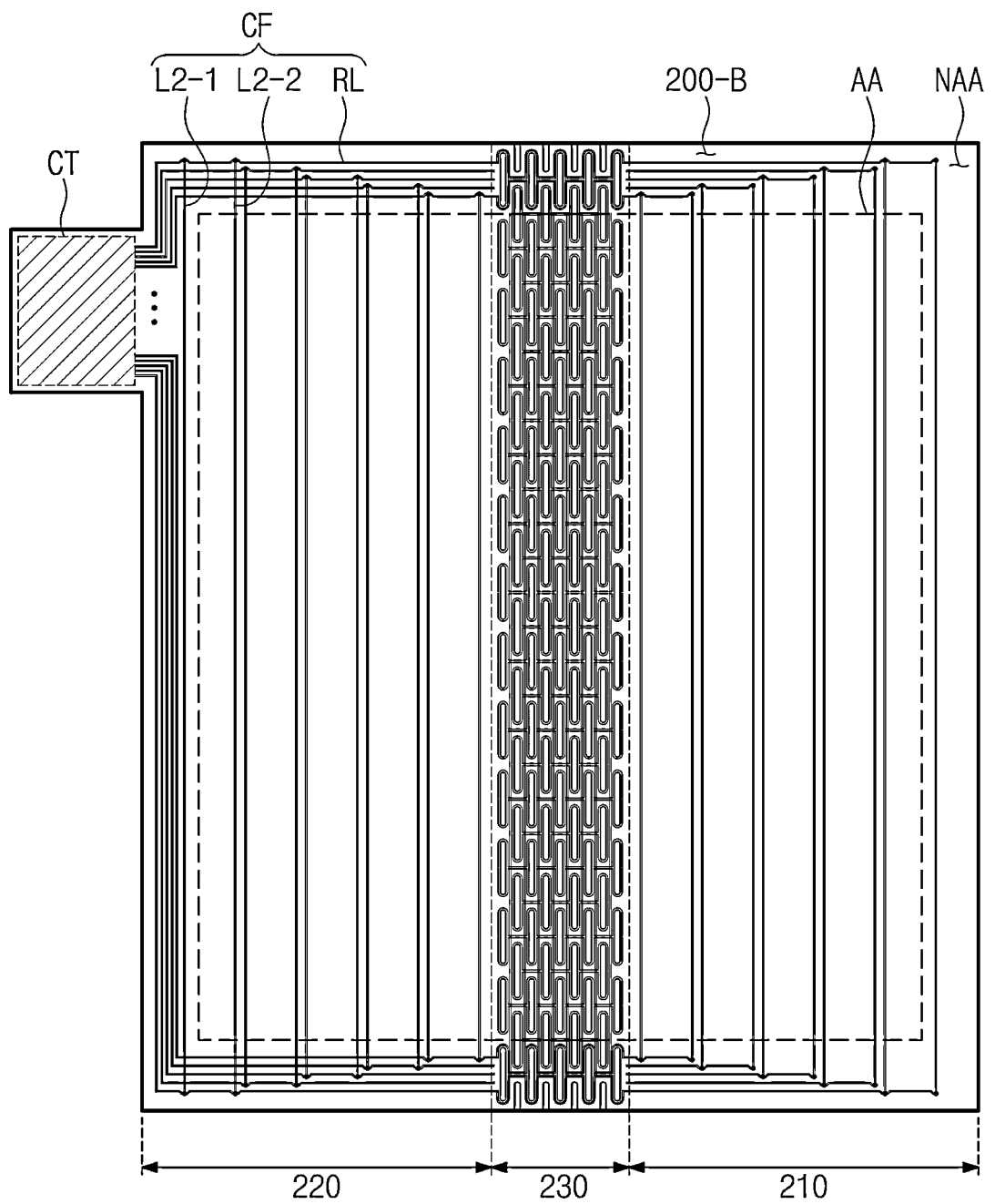
FIG. 4B is a rear view of a digitizer according to an embodiment of the invention.
Figure 5:
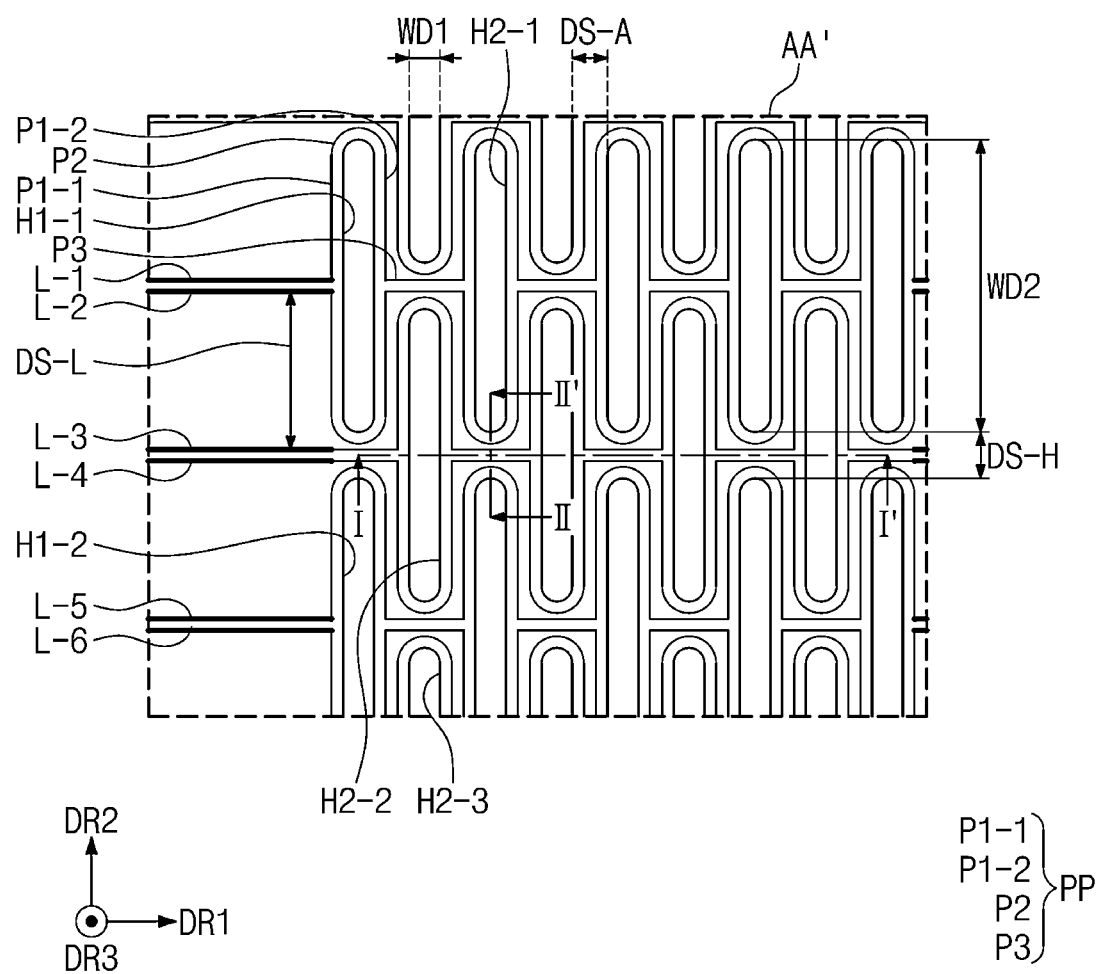
FIG. 5 is an enlarged view showing a partial region of a digitizer according to an embodiment of the invention.

FIG. 4A a plan view of the digitizer 200 according to an embodiment of the invention. FIG. 4B is a rear view of the digitizer 200 according to an embodiment of the invention. FIG. 5 is an enlarged view showing a partial region of the digitizer 200 according to an embodiment of the invention. Particularly, FIG. 5 is a plan view of enlarged region AA' of FIG. 4A.

FIG. 4A illustrates the sensing coils RF disposed on a front (or upper) surface 200-U of the digitizer 200, and FIG. 4B illustrates the sensing coils CF disposed on a rear (or bottom) surface 200-B of the digitizer 200.

Referring to FIG. 4A and FIG. 4B, an embodiment of the digitizer 200 may include an active region AA and a peripheral region NAA. The active region AA may be defined as a region in which an input of a pen is sensed, and the peripheral region NAA may be a region in which connection wires for allowing each of the sensing coils RF and CF to form a loop are disposed. The digitizer 200 may include a plurality of sensing coils RF and CF, and a connector CT.

Referring to FIG. 4A, each of the first sensing coils RF may include first and second long sides L1-1 and L1-2 extending in the first direction DR1, and short sides SL extending in the second direction DR2 and connecting one end of each of the first and second long sides L1-1 and L1-2 spaced apart in the second direction DR2 to each other, that is, connected between one end of the first long side L1-1 and one end of the second long side L1-2, which are spaced apart from each other in the second direction DR2.

Lengths in the second direction DR2 of the short sides SL may be different from each other. Accordingly, widths in the second direction DR2 between the first and second long sides L1-1 and L1-2 included in each of the first sensing coils RF may be different from each other. However, the embodiment of the invention is not limited thereto, and the lengths in the second direction DL2 of the short sides SL may be the same as each other, and each of the first sensing coils RF forming one loop may be spaced apart from each other.

In the first and second long sides L1-1 and L1-2, a portion crossing the folding portion 230 may extend from the first non-folding portion 210 to the second non-folding portion 220 via between the holes HL. A description thereof will be given later.

According to an embodiment, the first and second long sides L1-1 and L1-2 and the short sides SL may be disposed in (or directly on) different layers from each other. In an embodiment, for example, the short sides SL may be disposed in (or directly on) a same layer as the second sensing coils CF.

One end of each of the first sensing coils RF extending to the peripheral region NAA may be connected to the connector CT.

Referring to FIG. 4B, each of the second sensing coils CF may include third and fourth long sides L2-1 and L2-2 extending in the second direction DR2, and routing wires RL extending in the first direction DR1 and connecting one end of each of the third and fourth long sides L2-1 and L2-2 spaced apart in the first direction DR1 to each other.

In the third and fourth long sides L2-1 and L2-2, wires disposed in the folding portion 230 may be arranged in the second direction DR2 and may be disposed between the holes HL spaced apart along the first direction DR1. In addition, among the routing wires RL, wires disposed in the folding portion 230 may be connected to one end of each of the corresponding third and fourth long sides L2-1 and L2-2 via an area between the holes HL.

One end of each of the second sensing coils CF extending to the peripheral region NAA may be connected to the connector CT.

The second sensing coils CF may be referred to as driving coils, and the first sensing coils RF may be referred to as sensing coils, but are not limited thereto, and may be vice versa. When a current flows in the second sensing coils CF, a magnetic force line may be induced between the second sensing coils CF and the first sensing coils RF. The first sensing coils RF may sense induced electromagnetic force emitted from an electromagnetic pen and output the sensed electromagnetic force as a sensing signal to one terminal of each of the first sensing coils RF. The one terminal of each of the first sensing coils RF may be connected to signal lines disposed in the peripheral region NAA.

Referring to FIG. 5, each of the holes HL of the folding portion 230 may have a first width WD1 in the first direction DR1. In an embodiment, for example, the first width WD1 may be in a range of about 0.1 millimeter (mm) to about 0.5 mm. Each of the holes HL may have a second width WD2 in the second direction DR2. In an embodiment, for example, the second width WD2 may be in a range of about 4 mm to about 10 mm.

The holes HL may include a first group hole and a second group hole. In an embodiment, for example, the first group hole may include a first first hole (hereinafter, will be referred to as "1-1 hole") H1-1 and a second first hole ((hereinafter, will be referred to as "1-2 hole") H1-2 arranged in the second direction DR2. The second group hole may be spaced apart from the first group hole along the first direction DR1, and may include a first second hole (hereinafter, will be referred to as "2-1 hole") H2-1, a second second hole (hereinafter, will be referred to as "2-2 hole") H2-2, and a third second hole (hereinafter, will be referred to as "2-3 hole") H2-3 arranged in the second direction DR2.

The second group hole may be shifted from the first group hole by a predetermined distance in the second direction DR2. According to an embodiment, the shifted distance may be less than half of the second width WD2. Therefore, a shape of the folding portion 230 excluding the holes HL may have a slit form of a grid pattern.

Among holes included in different group holes from each other, when viewed in the third direction DR3, a first separation distance DS-A between overlapping holes in the first direction DR1, for example, the first separation distance DS-A in the first direction DR1 between the 1-1 hole H1-1 of the first group hole and the 2-1 hole H2-1 of the second group hole overlapping each other in the first direction DR1 may be in a range of about 0.1 mm to about 0.3 mm.

Among holes included in a same group hole, a second separation distance DS-H between holes HL adjacent in the second direction DR2, for example, the second separation distance DS-H in the second direction DR2 between the 1-1 hole H1-1 and the 1-2 hole H1-2 which are included in the first group hole may be in a range of about 0.1 mm to about 0.3 mm.

In an embodiment, a separation distance DS-L in the second direction DR2 between a second coil L-2 and a third coil L-3 may be less than half of the sum of the second width WD2 and the second separation distance DS-H.

Among the first sensing coils RF, each of the first sensing coils RF disposed in the folding portion 230 may include a pattern portion PP. The pattern portion PP may cross between the holes HL. The pattern portion PP may be provided in plurality in one first sensing coil RF, and the pattern portions PP may be arranged along the second direction DR2.

According to an embodiment, the pattern portion PP may include first patterns P1-1 and P1-2, a second pattern P2, and a third pattern P3.

Each of the first patterns P1-1 and P1-2 may extend in the second direction DR2 and may be spaced apart along the first direction DR1 with one corresponding hole HL interposed therebetween. The second pattern P2 may be connected to one end of each of the first patterns P1-1 and P1-2 to connect the first patterns P1-1 and P1-2.

The second pattern P2 may have a predetermined curvature corresponding to an edge of the hole HL. The third pattern P3 may be connected to the other end of the 1-2 pattern P1-2 and the other end of the 1-1 pattern P1-1 included in another pattern portion PP of the same first sensing coil RF. Accordingly, pattern portions PP disposed in the folding portion 230 of one first sensing coil RF may be disposed between the holes HL.

FIG. 5 illustrates, among the first sensing coils RF, coils L-1, L-2, L-3, L-4, L-5, and L-6 forming different loops, as an example.

A first line width of coils disposed in the first and second non-folding portions 210 and 220 among the first sensing coils RF may be greater than a second line width of coils disposed in the folding portion 230 among the first sensing coils RF. In an embodiment, for example, the first line width may be in a range of about 200 μm to about 400 μm, and the second line width may be in a range of about 30 μm to about 60 μm.

Figure 6B:
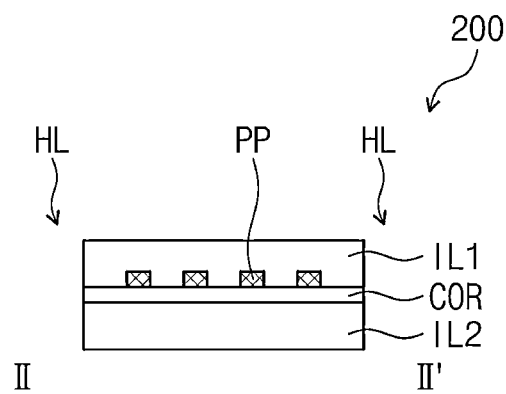
FIG. 6B is a cross-sectional view of a digitizer according to an embodiment of the invention.

FIG. 6A is a cross-sectional view of the digitizer 200 according to an embodiment of the invention. Particularly, FIG. 6A shows a view corresponding to a cross-section taken along line I-I' of FIG. 5. FIG. 6B is a cross-sectional view of the digitizer 200 according to an embodiment of the invention. Particularly, FIG. 6B shows a view corresponding to a cross-section taken along line II-II' of FIG. 5.

The digitizer 200 according to an embodiment of the invention includes a core layer COR, the first insulation layer IL1 disposed above the core layer COR, the second insulation layer IL2 disposed below the core layer COR, and the plurality of sensing coils RF and CF disposed between the first insulation layer IL1 and the second insulation layer IL2. The plurality of sensing coils RF and CF may include the first sensing coils RF and the second sensing coils CF.

Referring to FIG. 6A, the holes HL defined in the folding portion 230 of the digitizer 200 may extend entirely through the digitizer 200 from the first insulation layer IL1 to the second insulation layer IL2 in the third direction DR3.

Referring to FIG. 6B, portions (the pattern portion PP) of the first sensing coils RF forming four different loops from each other may be disposed between holes HL adjacent to each other in the second direction DR2.

The first insulation layer IL1 may be disposed on a front surface of the digitizer 200 to cover the first sensing coils RF. The second insulation layer IL2 may be disposed on a rear surface of the digitizer 200 to cover the second sensing coils CF.

The core layer COR of the invention may include a polymer. In an embodiment, for example, the core layer COR may include polyimide (PI). In an alternative embodiment, the core layer may include polyetherimide (PEI), polyethersulfone (PES), polysulfone (PSU), polyarylate (PAR), polysulfonesulfide (PPS), polyether ether ketone (PEEK), or polyamide-imide (PAI). In an embodiment, a thickness $t_{COR}$ of the core layer COR may be in a range of about 10 μm to about 20 μm.

In such an embodiment, since the core layer COR includes a highly flexible polymer, when the sensing coils RF and CF are disposed and compressed, an effect of aligning wires may be exhibited. That is, a portion in which the sensing coils RF and CF are compressed is not visually recognized, so that surface quality may be improved. In addition, since the core layer COR includes a highly flexible polymer, tensile strain properties of the digitizer 200 are improved, and accordingly, folding properties thereof may be improved.

In an embodiment of the invention, the first insulation layer IL1 and the second insulation layer IL2 of may include a fiber reinforced plastic (FRP). In an embodiment, for example, the first insulation layer IL1 and the second insulation layer IL2 may include a glass fiber reinforced plastic (GFRP) or a carbon fiber reinforced plastic (CFRP).

In such an embodiment, since the first insulation layer IL1 and the second insulation layer IL2 include a fiber reinforced plastic, rigidity and surface hardness are improved, so that the digitizer 200 may simultaneously function as a sensing member and function as a protection member. Accordingly, a separate protection member may be omitted, thereby reducing the thickness of the display device 1000 (see FIG. 1A).

In such an embodiment, since the core layer COR includes a polymer, a fiber reinforced plastic having relatively high strength and relatively high surface hardness may be applied to the first insulation layer IL1 and the second insulation layer IL2. In an embodiment, for example, a fiber reinforced plastic having a surface hardness in a range of about 20 gigapascals (GPa) to about 80 GPa may be applied to the first insulation layer IL1 and the second insulation layer IL2.

The higher the strength and the surface hardness of the fiber reinforced plastic, the higher the brittleness. Therefore, in a case where a core layer includes a fiber reinforced plastic, it may be difficult to apply a fiber reinforced plastic having high strength and high surface hardness to a first insulation layer and a second insulation layer in consideration of folding properties. In addition, a fiber reinforced plastic having low strength and low surface hardness (e.g., about 15 GPa) is desired to be applied to the first insulation layer and the second insulation layer to provide the sensing coils RF and CF therein.

In an embodiment, the first insulation layer IL1 and the second insulation layer IL2 may have a same physical properties as each other. In an embodiment, the first insulation layer IL1 and the second insulation layer IL2 may include a same material as each other. In an embodiment, fiber reinforced plastics included in the first insulation layer IL1 and the second insulation layer IL2 may have a same fiber lattice shape, fiber stacking structure, fiber lattice direction, fiber thickness, or the like. In such an embodiment where the first insulation layer IL1 and the second insulation layer IL2 have a same physical properties as each other, the shape of the digitizer 200 may be more effectively maintained.

In an embodiment, a thickness $t_{IL1}$ of the first insulation layer IL1 and a thickness $t_{IL2}$ of the second insulation layer IL2 may be the same as each other. In such an embodiment where the first insulation layer IL1 and the second insulation layer IL2 have a same thickness as each other, the shape of the digitizer 200 may be more effectively maintained. In an embodiment, for example, the thickness $t_{IL1}$ of the first insulation layer IL1 and the thickness $t_{IL2}$ of the second insulation layer IL2 may be in a range of about 40 μm to about 100 μm. In such an embodiment where the thickness $t_{IL1}$ of the first insulation layer IL1 and the thickness $t_{IL2}$ of the second insulation layer IL2 is the above thickness range, impact resistance properties of the digitizer 200 may be further improved.

In an embodiment, the thickness of the digitizer 200 of an embodiment may be in a range of about 100 μm to about 300 μm.

Figure 7:
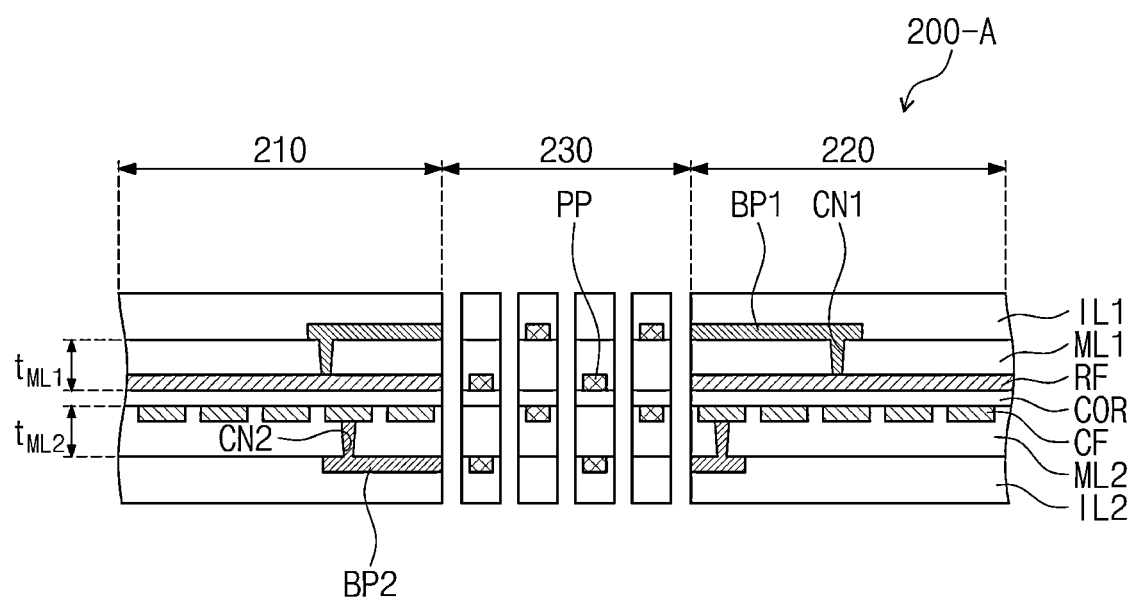
FIG. 7 is a cross-sectional view of a digitizer according to an embodiment of the invention.

FIG. 7 is a cross-sectional view of a digitizer 200-A according to an embodiment of the invention. In describing FIG. 7, the same/similar reference numerals are used for the same/similar components as those of FIG. 3 to FIG. 6B, and any repetitive detailed descriptions thereof will be omitted or simplified.

Referring to FIG. 7, the digitizer 200-A according to an embodiment may include a first middle layer ML1, and a second middle layer ML2. The first middle layer ML1 may be disposed between a core layer COR and a first insulation layer IL1. The second middle ML2 may be disposed between the core layer COR and a second insulation layer IL2.

In an embodiment, first sensing coils RF may be disposed between the core layer COR and the first middle layer ML1, and second sensing coils CF may be disposed between the core layer COR and the second intermediate layer ML2.

In addition, the digitizer 200-A according to an embodiment may include bridge wires BP1 and BP2. The bridge wires BP1 and BP2 may include a first bridge wire BP1 and a second bridge wire BP2. The first bridge wire BP1 may be disposed on the first middle layer ML1, and may be covered by the first insulation layer IL1. The first bridge wire BP1 may be electrically connected to the first sensing coils RF through a first bridge contact hole CN1 defined in the first middle layer ML1. The second bridge wire BP2 may be disposed on the second middle layer ML2, and may be covered by the second insulation layer IL2. The second bridge wire BP2 may be electrically connected to the second sensing coils CF through a second bridge contact hole CN2 defined in the second middle layer ML2.

The first middle layer ML1 and the second middle layer ML2 may each include a fiber reinforced plastic. In an embodiment, for example, the first middle layer ML1 and the second middle layer ML2 may each include a glass fiber reinforced plastic or a carbon fiber reinforced plastic. The first middle layer ML1 and the second middle layer ML2 may include a same material as each other. In an embodiment, for example, the first middle layer ML1 and the second middle layer ML2 may both include a glass fiber reinforced plastic, or the first middle layer ML1 and the second middle layer ML2 may both include a carbon fiber reinforced plastic. In addition, fiber reinforced plastics included in the first middle layer ML1 and the second middle layer ML2 may have a same fiber lattice shape, fiber stacking structure, fiber lattice direction, fiber thickness, or the like. In such an embodiment where the first middle layer ML1 and the second middle layer ML2 have a same physical properties as each other, the shape of the digitizer 200 may be more effectively maintained. In an embodiment where the first middle layer ML1 and the second middle layer ML2 each include a fiber reinforced plastic, a thickness $t_{ML1}$ of the first middle ML1 and a thickness $t_{ML2}$ of the second middle ML2 may be the same as each other, and each of the thickness $t_{ML1}$ of the first middle ML1 and the thickness $t_{ML2}$ of the second middle ML2 may be in a range of about 40 μm to about 60 μm.

The first middle layer ML1 and the second middle layer ML2 may each include a polymer. In an embodiment, for example, the first middle layer ML1 and the second middle layer ML2 may each include polyimide (PI). In an alternative embodiment, the first middle layer ML1 and the second middle layer ML2 may each include (or further include) polyetherimide (PEI), polyethersulfone (PES), polysulfone (PSU), polyarylate (PAR), polysulfonesulfide (PPS), polyether ether ketone (PEEK), or polyamide-imide (PAI). The first middle layer ML1 and the second middle layer ML2 may include a same material as each other. In an embodiment, for example, the first middle layer ML1 and the second middle layer ML2 may both include polyimide. In such an embodiment where the first middle layer ML1 and the second middle layer ML2 have a same physical properties as each other, the shape of the digitizer 200 may be more effectively maintained. In such an embodiment where the first middle layer ML1 and the second middle layer ML2 each include a polymer, the thickness $t_{ML1}$ of the first middle ML1 and the thickness $t_{ML2}$ of the second middle ML2 may be the same as each other, and each of the thickness $t_{ML1}$ of the first middle ML1 and the thickness $t_{ML2}$ of the second middle ML2 may be in a range of about 10 μm to about 20 μm.

FIG. 7 illustrates an embodiment where each of the first middle layer ML1 and the second middle layer ML2 has a single layer structure, but the embodiment of the invention is not limited thereto, and the first middle layer ML1 and the second middle layer ML2 may each include two or more layers. In an embodiment, for example, the first middle layer ML1 and the second middle layer ML2 may each have a two-layered or three-layered structure.

In an embodiment where the first middle layer ML1 and the second middle layer ML2 each include two or more layers, the number of layers included in each of the first middle layer ML1 and the second middle layer ML2 may be the same as each other. The two or more layers included in the first middle layer ML1 may include a same material as each other, or may include different materials from each other. The two or more layers included in the second middle layer ML2 may include a same material as each other, or may include different materials from each other. In addition, layers in in the first middle layer ML1 and the second middle layer ML2 in a symmetrical position with respect to the core layer COR may include a same material as each other, and may have a same thickness as each other.

In an embodiment, as shown in FIG. 7, electrical wires may have a four-layered structure of the first and second sensing coils RF and CF and the first and second bridge wires BP1 and BP2, but are not limited thereto, and may have, for example, a three-layered structure, or a five-layered to seven-layered structure.

Figure 8A:
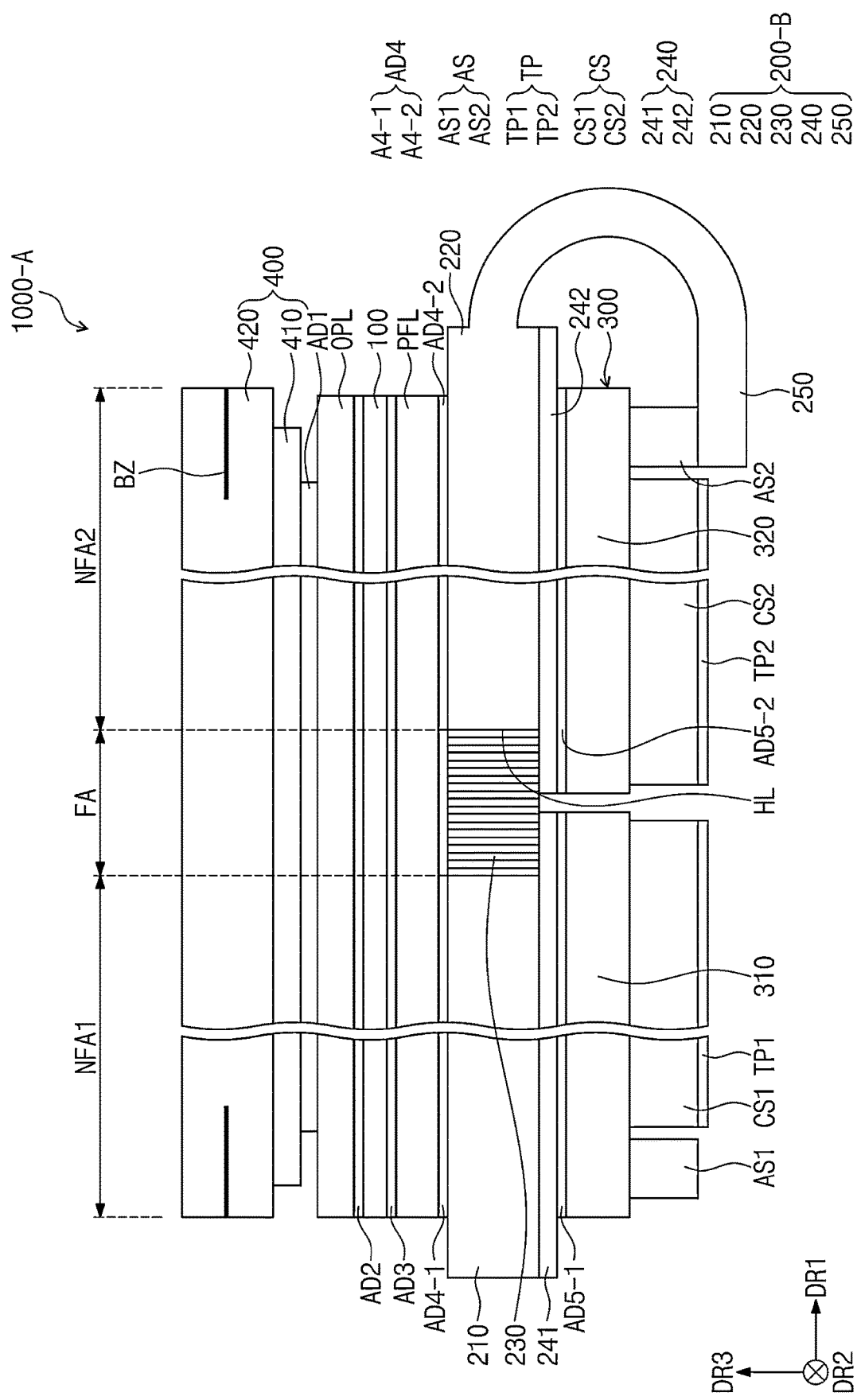
FIG. 8A is a cross-sectional view of a display device according to an embodiment of the invention.
Figure 8B:
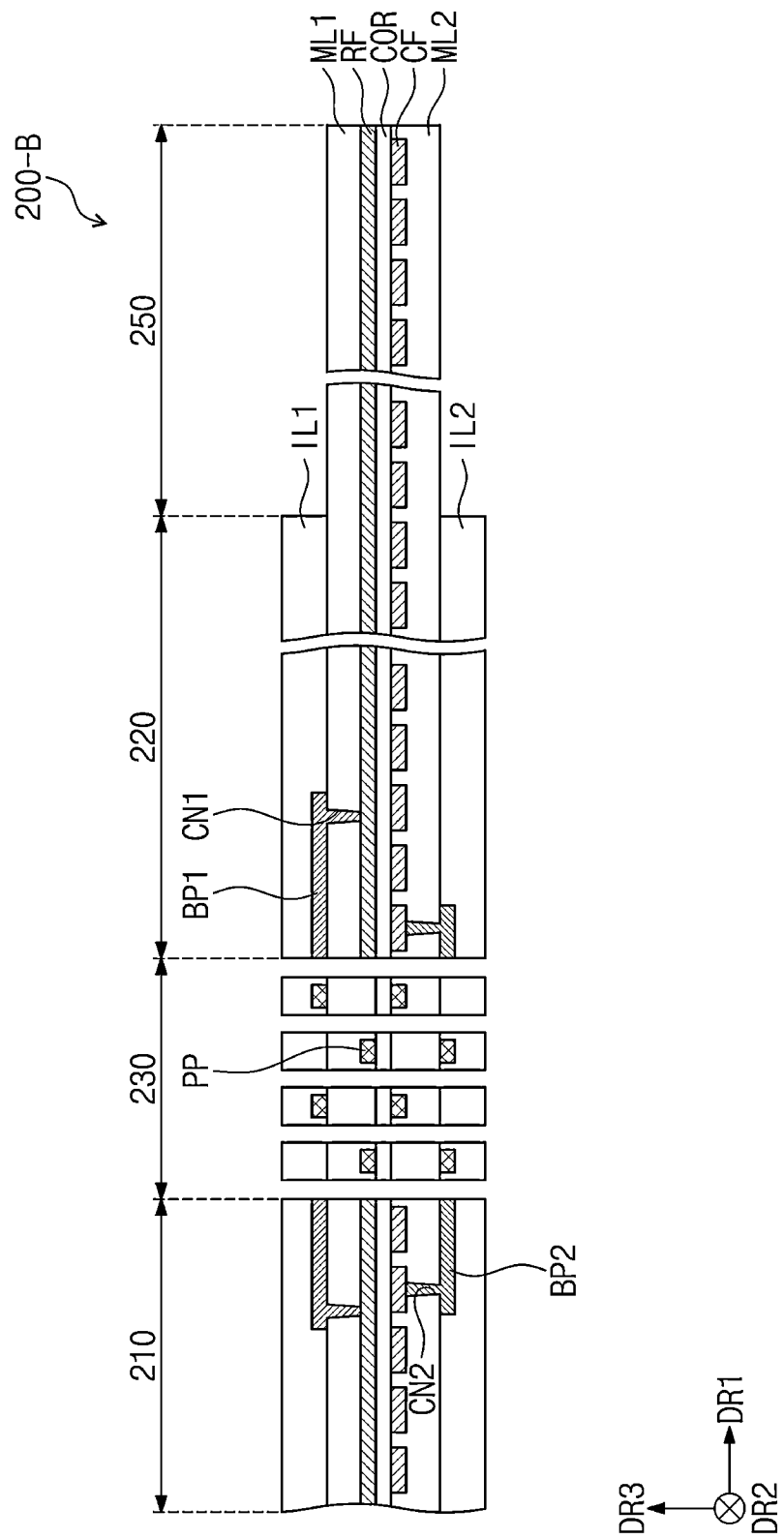
FIG. 8B is a cross-sectional view of a digitizer according to an embodiment of the invention.

FIG. 8A is a cross-sectional view of a display device 1000-A according to an embodiment of the invention. FIG. 8B is a cross-sectional view of a digitizer 200-B according to an embodiment of the invention. Particularly, FIG. 8B is a cross-sectional view illustrating a portion of the digitizer 200-B of FIG. 8A in a flat state. In describing FIG. 8A and FIG. 8B, the same/similar reference numerals are used for the same/similar components as those of FIG. 3 to FIG. 7, and any repetitive detailed descriptions thereof will be omitted or simplified.

Referring to FIG. 8A, the digitizer 200-B according to an embodiment may include a bending portion 250. The bending portion 250 of the digitizer 200-B may be spaced apart from a folding portion 230, and may be disposed adjacent to a second non-folding portion 220.

The bending portion 250 is folded (or foldable) along an imaginary folding axis extended along the second direction DR2, so that at least a portion of the bending portion 250 may be disposed overlapping at least a portion of the second non-folding portion 220 on a plane.

In such an embodiment where the digitizer 200-B includes the bending portion 250, the digitizer 200-B may serve as a connector CN (see FIG. 4A and FIG. 4B) by itself without using a separate member. In such an embodiment, since a separate member may be omitted, a compressing process for connecting the separate member, which may be visually recognized, is omitted, such that surface quality may be improved.

Referring to FIG. 8B, on a plane, a first insulation layer IL1 and a second insulation layer IL2 may correspond to first and second non-folding portions 210 and 220 and the folding portion 230. In addition, on a plane, a core layer COR, a first middle layer ML1, a second middle layer ML2, and first and second sensing coils RF and CF may respectively correspond to the first and second non-folding portions 210 and 220, the folding portion 230, and the bending portion 250.

In the digitizer 200-B according to an embodiment, the first middle layer ML1 and the second middle layer ML2 may include a polymer. In an embodiment, for example, the first middle layer ML1 and the second middle layer ML2 may each include polyimide (PI). In such an embodiment where the first middle layer ML1 and the second middle layer ML2 include a polymer with high flexibility, the first middle layer ML1 and the second middle layer ML2 may be bent without being damaged. In addition, the sensing coils RF and CF included inside may be protected from the outside.

Figure 9A:
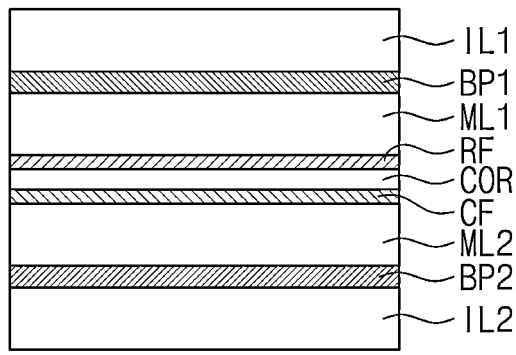
FIG. 9A is a cross-sectional view showing a stacking structure of a digitizer according to Example.
Figure 9B:
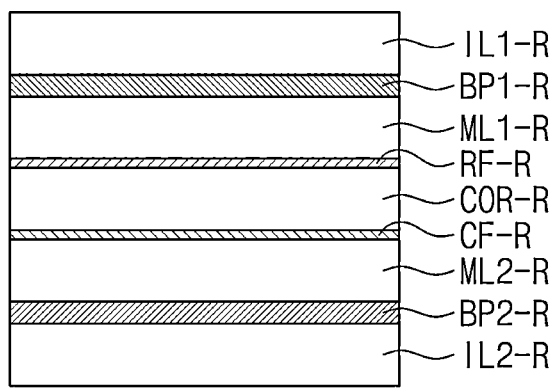
FIG. 9B is a cross-sectional view showing a stacking structure of a digitizer according to Comparative Example.
Figure 10:
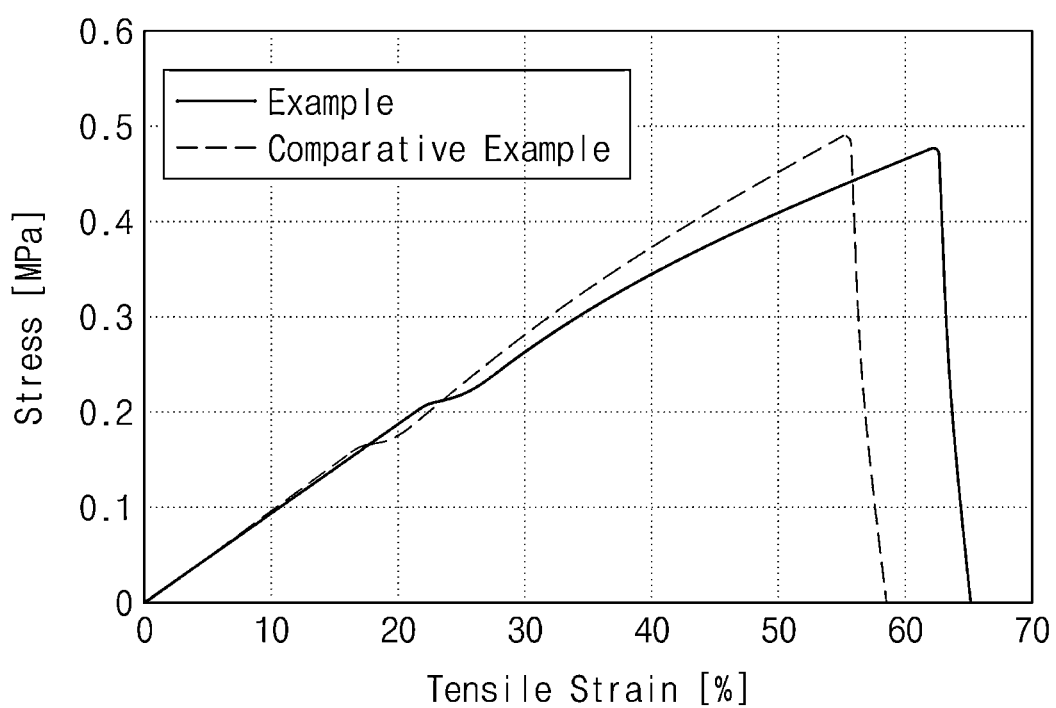
FIG. 10 is a graph showing tensile strain test results of digitizers according to Example and Comparative Example.
Figure 11A:
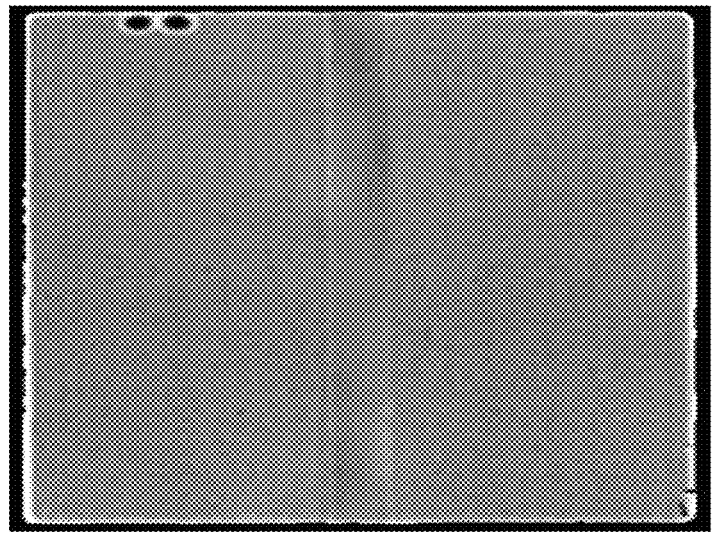
FIG. 11A is a plane photograph showing a surface quality test result of a digitizer according to Example of the invention.
Figure 11B:
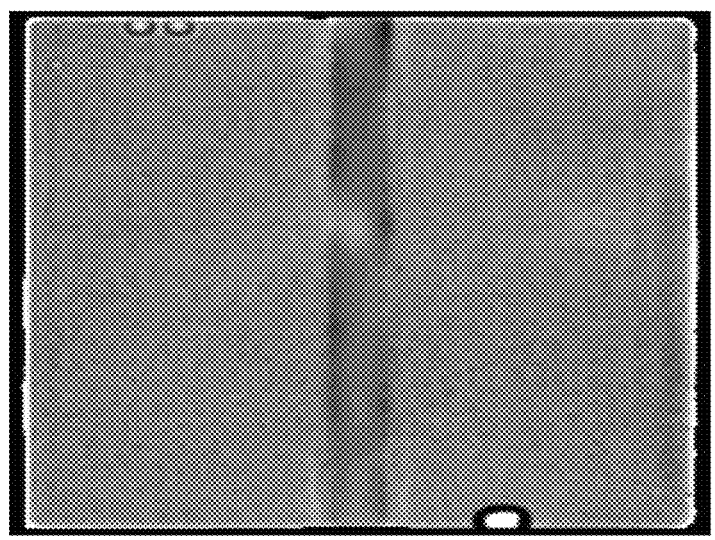
FIG. 11B is a plane photograph showing a surface quality test result of a digitizer according to Comparative Example.
Figure 12A:
FIG. 12A is a cross-sectional photograph showing a wiring alignment test result of a digitizer according to Example.
Figure 12B:
FIG. 12B is a cross-sectional photograph showing a wiring alignment test result of a digitizer according to Comparative Example.

FIG. 9A is a cross-sectional view showing a stacking structure of a digitizer according to Example. FIG. 9B is a cross-sectional view showing a stacking structure of a digitizer according to Comparative Example, FIG. 10 is a graph showing tensile strain test results of digitizers according to Example and Comparative Example. FIG. 11A is a plane photograph showing a surface quality test result of a digitizer according to Example. FIG. 11B is a plane photograph showing a surface quality test result of a digitizer according to Comparative. FIG. 12A is a cross-sectional photograph showing a wiring alignment test result of a digitizer according to Example. FIG. 12B is a cross-sectional photograph showing a wiring alignment test result of a digitizer according to Comparative Example.

FIG. 9A and FIG. 9B respectively illustrate stacking structures of samples for testing digitizers according to Example and Comparative Example.

The digitizer according to Example shown in FIG. 9A had a stacking structure of a second insulation layer IL2/a second bridge wire BP2/a second middle layer ML2/second sensing coils CF/a core layer COR/first sensing coils RF/a first middle layer ML1/a first bridge wire BP1/a first insulation layer IL1, where the thickness thereof was 40 μm/14 μm/40 μm/9 μm/13 μm/9 μm/40 μm/14 μm/40 μm, respectively. In Example, the core layer COR included polyimide, and the first insulation layer IL1, the second insulation layer IL2, the first middle layer ML1, and the second middle layer ML2 each included a glass fiber reinforced plastic. The digitizer according to Example shown in FIG. 9A is an example of embodiments of the invention.

The digitizer according to Comparative Example shown in FIG. 9B had a stacking structure of a second insulation layer IL2-R/a second bridge wire BP2-R/a second middle layer ML2-R/second sensing coils CF-R/a core layer COR-R/first sensing coils RF-R/a first middle layer ML1-R/a first bridge wire BP1-R/a first insulation layer IL1-R, where the thickness thereof was 40 μm/14 μm/40 μm/6 μm/40 μm/6 μm/40 μm/14 μm/40 μm, respectively. In Comparative Example, the core layer COR-R, the first insulation layer IL1-R, the second insulation layer IL2-R, the first middle layer ML1-R, and the second middle layer ML2-R each included a glass fiber reinforced plastic.

The digitizer according to Example of FIG. 9A and the digitizer according to Comparative Example of FIG. 9B both showed a flexural modulus in a range of about 28 GPa to about 30 GPa.

However, referring to FIG. 10, there was a difference in tensile strain. Specifically, the tensile strain just before the breakage was 62% for the digitizer according to Example having the structure of FIG. 9A, and was 54% for the digitizer according to Comparative Example having the structure of FIG. 9B. That is, it can be confirmed that the tensile strain was improved in the digitizer of Example.

In addition, the result of a folding reliability test in an environment of high temperature and high humidity (60° C./93%) showed that the digitizer according to Example having the structure of FIG. 9A was suitable, and the digitizer according to Comparative Example having the structure of FIG. 9B was defective.

Referring to FIG. 11A and FIG. 11B, it can be confirmed that the surface quality of the digitizer according to Example having the structure of FIG. 9A has been improved compared to that of the digitizer according to Comparative Example having the structure of FIG. 9B.

Referring to FIG. 12A and FIG. 12B, it was shown that the digitizer according to Example having the structure of FIG. 9A had an effect of aligning copper wires when compressed compared to the digitizer according to Comparative Example having the structure of FIG. 9B. That is, in an embodiment including a core layer including polyimide, copper wires are flexibly aligned during compression, so that a compressed portion may not be visually recognized and surface quality may be improved.

According to embodiments of the invention described above, a digitizer may have high impact resistance, improved surface quality properties, and improved folding properties, that is, high reliability.

In addition, a display device according to an embodiment of the invention includes the digitizer, and thus may have high reliability while being thin.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A digitizer comprising a first non-folding portion, a folding portion provided with a plurality of holes defined therethrough, and a second non-folding portion, which are arranged along a first direction, the digitizer comprising:
   a core layer including a polymer;
   a first insulation layer including a fiber reinforced plastic, and disposed above the core layer;
   a second insulation layer including the fiber reinforced plastic, and disposed below the core layer; and
   a plurality of sensing coils disposed between the first insulation layer and the second insulation layer.

2. The digitizer of claim 1, wherein:
   the fiber reinforced plastic comprises a glass fiber reinforced plastic or a carbon fiber reinforced plastic; and
   the first insulation layer and the second insulation layer comprise a same material as each other.

3. The digitizer of claim 1, wherein a thickness of the first insulation layer and a thickness of the second insulation layer are the same as each other, and each of the thickness of the first insulation layer and the thickness of the second insulation layer is in a range of about 40 μm to about 100 μm.

4. The digitizer of claim 1, further comprising:
   a first middle layer disposed between the core layer and the first insulation layer; and
   a second middle layer disposed between the core layer and the second insulation layer,
   wherein each of the first middle layer and the second middle layer comprises the fiber reinforced plastic.

5. The digitizer of claim 4, wherein a thickness of the first middle layer and a thickness of the second middle layer are the same as each other, and each of the thickness of the first middle layer and the thickness of the second middle layer is in a range of about 40 μm to about 60 μm.

6. The digitizer of claim 1, further comprising:
   a first middle layer disposed between the core layer and the first insulation layer; and
   a second middle layer disposed between the core layer and the second insulation layer,
   wherein each of the first middle layer and the second middle layer includes the polymer.

7. The digitizer of claim 6, wherein a thickness of the first middle layer and a thickness of the second middle layer are the same as each other, and each of the thickness of the first middle layer and the thickness of the second middle layer is in a range of about 10 μm to about 20 μm.

8. The digitizer of claim 6, further comprising:
a bending portion spaced apart from the folding portion and disposed adjacent to the second non-folding portion,
wherein:
on a plane, the first insulation layer and the second insulation layer correspond to the first and second non-folding portions and the folding portion; and
on the plane, the core layer, the first middle layer, the second middle layer, and the sensing coils correspond to the first and second non-folding portions, the folding portion, and the bending portion.

9. A digitizer comprising a first non-folding portion, a folding portion provided with a plurality of holes defined therethrough, and a second non-folding portion, which are disposed along a first direction, the digitizer comprising:
a first insulation layer;
a second insulation layer including a same material as the first insulation layer, and disposed below the first insulation layer;
a core layer including a polymer, and disposed between the first insulation layer and the second insulation layer;
a first middle layer disposed between the core layer and the first insulation layer;
a second middle layer including a same material as the first middle layer, and disposed between the core layer and the second insulation layer; and
a plurality of sensing coils disposed between the first insulation layer and the second insulation layer.

10. The digitizer of claim 9, wherein:
a thickness of the first insulation layer and a thickness of the second insulation layer are the same as each other; and
a thickness of the first middle layer and a thickness of the second middle layer are the same as each other.

11. The digitizer of claim 9, wherein each of the first insulation layer and the second insulation layer comprises a glass fiber reinforced plastic or a carbon fiber reinforced plastic.

12. The digitizer of claim 9, wherein each of the first middle layer and the second middle layer comprises a glass fiber reinforced plastic or a carbon fiber reinforced plastic.

13. The digitizer of claim 9, wherein each of the first middle layer and the second middle comprises the polymer.

14. The digitizer of claim 13, further comprising:
a bending portion spaced apart from the folding portion and disposed adjacent to the second non-folding portion,
wherein:
on a plane, the first insulation layer and the second insulation layer correspond to the first and second non-folding portions and the folding portion; and
on the plane, the core layer, the first middle layer, the second middle layer, and the sensing coils correspond to the first and second non-folding portions, the folding portion, and the bending portion.

15. A display device comprising:
a digitizer including a first non-folding portion, a folding portion having a plurality of holes, and a second non-folding portion, which are arranged along a first direction;
a panel protection film disposed on the digitizer;
a display panel disposed on the panel protection film; and
an adhesive layer including a first portion attached between the panel protection film and the first non-folding portion of the digitizer, and a second portion attached between the panel protection film and the second non-folding portion of the digitizer,
wherein the digitizer includes:
a core layer including a polymer;
a first insulation layer including a fiber reinforced plastic, and disposed between the core layer and the panel protection film;
a second insulation layer including the fiber reinforced plastic, and disposed spaced apart from the panel protection film with the core layer interposed therebetween; and
a plurality of sensing coils disposed between the first insulation layer and the second insulation layer.

16. The display device of claim 15, wherein:
the fiber reinforced plastic comprises a glass fiber reinforced plastic or a carbon fiber reinforced plastic; and
the first insulation layer and the second insulation layer comprise a same material as each other.

17. The display device of claim 15, wherein a thickness of the first insulation layer and a thickness of the second insulation layer are the same as each other.

18. The display device of claim 15, wherein the digitizer further comprises a first middle layer disposed between the core layer and the first insulation layer, and a second middle layer disposed between the core layer and the second insulation layer,
wherein:
each of the first middle layer and the second middle layer include the fiber reinforced plastic; and
a thickness of the first middle layer and a thickness of the second middle layer are the same as each other.

19. The display device of claim 15, wherein the digitizer further comprises a first middle layer disposed between the core layer and the first insulation layer, and a second middle layer disposed between the core layer and the second insulation layer,
wherein:
each of the first middle layer and the second middle comprise the polymer; and
a thickness of the first middle layer and a thickness of the second middle layer are the same as each other.

20. The display device of claim 19, wherein the digitizer further comprises a bending portion spaced apart from the folding portion and disposed adjacent to the second non-folding portion,
wherein:
on a plane, the first insulation layer and the second insulation layer correspond to the first and second non-folding portions and the folding portion; and
on the plane, the core layer, the first middle layer, the second middle layer, and the sensing coils correspond the first and second non-folding portions, the folding portion, and the bending portion.

21. The display device of claim 20, wherein the bending portion is foldable along an imaginary folding axis extending along a second direction intersecting the first direction, wherein on the plane, at least a portion of the bending portion overlaps at least a portion of the second non-folding portion.

22. The display device of claim 15, wherein a thickness of the digitizer is in a range of about 100 μm to about 300 μm.

* * * * *